United States Patent [19]

Yoshida et al.

[11] E Patent Number: Re. 33,162

[45] Reissued Date of Patent: Feb. 13, 1990

[54] METHOD AND APPARATUS FOR GUIDANCE OF AN OPERATION OF OPERATING POWER PLANTS

[75] Inventors: Kenichi Yoshida, Hachioji; Takao Watanabe, Hitachi; Takashi Kiguchi, Mito, all of Japan

[73] Assignee: Hitachi, Ltd., Tokyo, Japan

[21] Appl. No.: 141,304

[22] Filed: Jan. 6, 1988

Related U.S. Patent Documents

Reissue of:

[64] Patent No.: 4,563,746
Issued: Jan. 7, 1986
Appl. No.: 433,908
Filed: Oct. 12, 1982

[30] Foreign Application Priority Data

Oct. 14, 1981 [JP] Japan ..... 56-164632

[51] Int. Cl.[4] ..... G06F 15/46; G06F 15/18

[52] U.S. Cl. ..... 364/492; 364/300; 364/551.01

[58] Field of Search ..... 364/200, 300, 900, 148, 364/184, 492, 550, 551, 513; 376/216, 217

[56] References Cited

U.S. PATENT DOCUMENTS 4,290,114 9/1981 Sinay ..... 364/492
4,328,556 5/1982 Abe et al. ..... 364/492
4,455,614 6/1984 Martz et al. ..... 364/494
4,459,259 7/1984 Colley ..... 364/492 X
4,632,802 12/1986 Herbst et al. ..... 364/184

*Primary Examiner*—Parshotam S. Lall
*Assistant Examiner*—Kevin Teska
*Attorney, Agent, or Firm*—Antonelli, Terry & Wands

[57] ABSTRACT

This invention refers to a [plant operating] method *and apparatus for guidance of an operation* for overcoming an abnormal status of a plant. A plant data is detected from the plant, and all plant state members indicating an abnormality of the plant are identified from the plant data. The plant operating method *and apparatus* includes *apparatus for* estimating a cause whereby the plant status members are produced, predicting all plant status members arising after passing a given period of time according to the estimated cause, determining whether or not actual plant status members are present in the plant state members predicted and when the latter members are not present in the former members, repeatedly carrying out the processing of the steps of estimating and predicting to which the plant status members forcasted at the predicting step are inputted until all the actual plant status members come to exist in the plant status members forecasted at the predicting step. When all the actual plant status members are present in the plant status members predicted at the predicting step, a plant operation for overcoming the cause obtained at the step of estimating which produces the predicted plant status members is selected, and the plant operation is carried out according to the selected operation.

71 Claims, 18 Drawing Sheets

FIG. 2

| IF PART | THEN PART |
|---|---|
| SEIZURE OF PRIMARY LOOP RECIRCULATION PUMP | VOID INCREASE<br>JET PUMP FLOW DECREASE |
| VOID INCREASE | REACTOR WATER LEVEL RISE |
| VOID DECREASE | REACTOR WATER LEVEL FALL |
| FEED WATER CONTROL SYSTEM FAILURE | FEED WATER LOW INCREASE |
| FEED WATER FLOW INCREASE | REACTOR WATER LEVEL RISE |
| REACTOR WATER LEVEL=L8 | TURBINE TRIP |
| TURBINE TRIP | SCRAM<br>SWITCH ELECTRIC BUS<br>REACTOR PRESSURE RISE |
| MOTOR DRIVEN REACTOR FEED PUMP TRIP | REACTOR WATER LEVEL LOW |
| REACTOR SCRAM(AFTER PREDETERMINEDTIME PASSED) | VOID DECREASE |
| REACTOR PRESSURE HIGH | TURBINE BYPASS VALVE OPEN |
| FEED WATER CONTROL SYSTEM FAILURE | FLOW MISMATCH |

FIG. 3

| NAME | REACTOR WATER LEVEL |
|---|---|
| VALUE | L8:1500mm~<br>L7:1300mm~1500mm<br>L6:---- |
| NORMAL VALUE | L4 |
| CHANGE RATE | RAPIDLY : 300mm/sec~<br>ORDINARY: 100mm/sec~300mm/sec<br>SLOWLY : 0mm/sec~100mm/sec |
| CALCULATION METHOD FOR TIME | (TIME)={(BOUNDARY VALUE)<br>-(PRESENT VALUE)}/(CHANGE RATE) |
| CALCULATION METHOD FOR VALUE | (VALUE)=(PRESENT VALUE)<br>+(CHANGE RATE)x(TIME) |

FIG. 4

| IF PART | COUNTERMEASURE |
|---|---|
| REACTOR WATER LEVEL=L8 | MOTOR DRIVEN REACTOR FEED PUMP TRIP |
| REACTOR WATER LEVEL=L2 | HIGH PRESSURE INJECTION SYSTEM |
| REACTOR WATER LEVEL=L1 | AUTO-DEPRESSURIZATION SYSTEM OF RELIEF VALVE AND LOW PRESSURE INJECTION SYSTEM |
| REACTOR PRESSURE HIGH | AUTO-DEPRESSURIZATION SYSTEM OF RELIEF VALVE |

FIG. 5

| | |
|---|---|
| NAME | HPCS |
| START UP OPERATION (EXPLANATION) | CONFIRM FOLLOWING ITEMS<br>RESET ISOLATION SIGNAL<br>STEAM LINE WARNING |
| OPERATION CONDITION (RESTRICTION) | HPCS SUCTION VALVE OPEN<br>STAND-BY AT STANDBY GAS TREATMENT SYSTEM |

FIG. 6

| | |
|---|---|
| NO. | 1 |
| CAUSE | SEIZURE OF PRIMARY LOOP RECIRCULATION PUMP |
| COMMENT | RESULT OF ANALYSIS |
| KEY WORD | VOID INCREASE<br>SCRAM<br>JET PUMP FLOW DECREASE |
| DATA FOR DISPLAY | 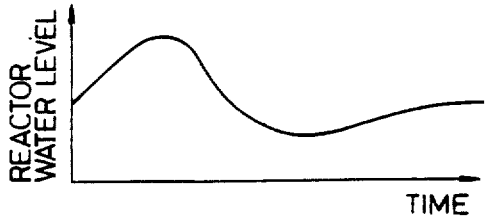 |

FIG. 20

REACTOR WATER LEVEL = L7
JET PUMP FLOW DECREASE

46

FIG. 21

REACTOR WATER LEVEL = L7
JET PUMP FLOW DECREASE

47

FIG. 22A

VOID INCREASE

48A

FIG. 22B

FEED WATER FLOW INCREASE

48B

FIG. 23A

VOID INCREASE
REACTOR WATER LEVEL RISE L7

50A

FIG. 23B

FEED WATER FLOW INCREASE
REACTOR WATER LEVEL RISE L7

50B

FIG. 26A

```
SEIZURE OF PRIMARY LOOP RECIRCULATION PUMP
   VOID INCREASE
      REACTOR WATER LEVEL RISE L8
         TURBINE TRIP
            SCRAM
            SWITCH ELECTRIC BUS
            REACTOR PRESSURE RISE
   JET PUMP FLOW DECREASE
MOTOR DRIVEN REACTOR FEED PUMP TRIP
```

57A

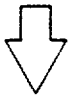

```
SEIZURE OF PRIMARY LOOP RECIRCULATION PUMP
         TURBINE TRIP
            SCRAM
            SWITCH ELECTRIC BUS
            REACTOR PRESSURE HIGH
   JET PUMP FLOW DECREASE
MOTOR DRIVEN REACTOR FEED PUMP TRIP
VOID DECREASE
   REACTOR WATER LEVEL FALL L4
TURBINE BYPASS VALVE OPEN
```

59B

FIG. 26B

```
SEIZURE OF PRIMARY LOOP RECIRCULATION PUMP
   VOID INCREASE
      REACTOR WATER LEVEL RISE L8
         TURBINE TRIP
            SCRAM
            SWITCH ELECTRIC BUS
            REACTOR PRESSURE RISE
   JET PUMP FLOW DECREASE
NO-OPERATION
```

57B

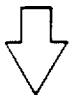

```
SEIZURE OF PRIMARY LOOP RECIRCULATION PUMP
         TURBINE TRIP
            SCRAM
            SWITCH ELECTRIC BUS
            REACTOR PRESSURE HIGH
   JET PUMP FLOW DECREASE
NO-OPERATION
VOID DECREASE
   REACTOR WATER LEVEL FALL L6
TURBINE BYPASS VALVE OPEN
```

59B

FIG. 25

```
SEIZURE OF PRIMARY LOOP RECIRCULATION PUMP
   VOID INCREASE
      REACTOR WATER LEVEL RISE L8
         TURBINE TRIP
            SCRAM
            SWITCH ELECTRIC BUS
            REACTOR PRESSURE RISE
   JET PUMP FLOW DECREASE
NO-OPERATION
```

56

FIG. 27A

```
   SEIZURE OF PRIMARY RECIRCULATION PUMP
            TURBINE TRIP
               SCRAM
               SWITCH ELECTRIC BUS
      JET PUMP FLOW DECREASE
   MOTOR DRIVEN REACTOR FEED PUMP TRIP
   VOID DECREASE
      REACTOR WATER LEVEL FALL L2
   TURBINE BYPASS VALVE OPEN
      REACTOR PRESSURE FALL
```

60A

FIG. 27B

```
SEIZURE OF PRIMARY LOOP RECIRCULATION PUMP
         TURBINE TRIP
            SCRAM
            SWITCH ELECTRIC BUS
   JET PUMP FLOW DECREASE
NO-OPRATION
VOID DECREASE
   REACTOR WATER LEVEL FALL L4
TURBINE BYPASS VALVE OPEN
   REACTOR PRESSURE FALL
```

60B

METHOD AND APPARATUS FOR GUIDANCE OF AN OPERATION OF OPERATING POWER PLANTS

Matter enclosed in heavy brackets [ ] appears in the original patent but forms no part of this reissue specification; matter printed in italics indicates the additions made by reissue.

BACKGROUND OF THE INVENTION

This invention relates to a method [of] *and apparatus for guidance such as* operating power plants, and particularly to that by which a pertinent guide for operation can be provided to cope with an abnormality of the plants.

A method to utilize Cause-Consequence Tree (hereinafter referred to as "CCT") has been proposed hitherto for providing a guide for operation at the time of a plant abnormality.

CCT is a process of putting the relation of cause and effect of a phenomenon taking place at a plant on the tree and is powerful to function when utilized for a guidance implementation of operation at the time of a plant abnormality. However, a huge quantity of CCT will have to be prepared to multiply the phenomenon with which the operation guide apparatus for a plant utilizing CCT is capable of coping, thus involving a difficulty for implementation and maintenance.

Then, a technique of knowledge engineering which is utilized for a medical consultation system will be taken up as the technique for implementation of a guidance system utilizing a small-scale data base effectively.

SUMMARY OF THE INVENTION

An *object of this invention is to provide a method and apparatus for guidance of an operation. Another* object of this invention is to obtain a cause of an abnormality arising at a plant with precision.

Another object of this invention is to obtain an optimal and secure operation necessary to cope with an abnormality arising at a plant.

Further object of this invention is to minimize capacity of a data base.

A feature of this invention is to *provide a method and apparatus to* repeat a processing comprising a step to decide an existence of an actual plant state member in a forecasted plant state member and also to estimate a cause of bringing about the state member, when the latter member is not present in the former member, by inputting the forecasted plant state member until all the actual plant state members come to exist in the forecasted plant state member, and a step to forecast all the plant state members to arise after passing a given period of time according to the cause so estimated.

FIG. 2 is an explanatory drawing representing an example of the contents of a cause-consequence data base shown in FIG. 1;

FIG. 3 is an explanatory drawing representing an example of the contents of a transition forecast data base shown in FIG. 1;

FIG. 4 is an explanatory drawing representing an example of the contents of an operation data base shown in FIG. 1;

FIG. 5 is an explanatory drawing representing an example of the contents of a particularization data base shown in FIG. 1;

FIG. 6 is an explanatory drawing representing an example of the contents of a case data base shown in FIG. 1;

FIG. 20 is an explanatory drawing of a plant state signal outputted from the data conversion division;

FIG. 21 is an explanatory drawing of a plant state signal outputted from the state grasp division;

FIG. 22A and FIG. 22B are explanatory drawings of a plant state signal outputted from the state grasp division in the cause decision division;

FIG. 23A and FIG. 23B are explanatory drawings of a plant state signal outputted from the forecast division in the cause decision division;

FIG. 25 is an explanatory drawing of a plant state signal outputted from the state grasp division of the optimal operation determination division;

FIG. 26A and FIG. 26B, FIG. 27A and FIG. 27B are explanatory drawings of a plant state signal outputted from the forecast division and the state grasp division of the optimal operation determination division called recursively.

Figure 1:
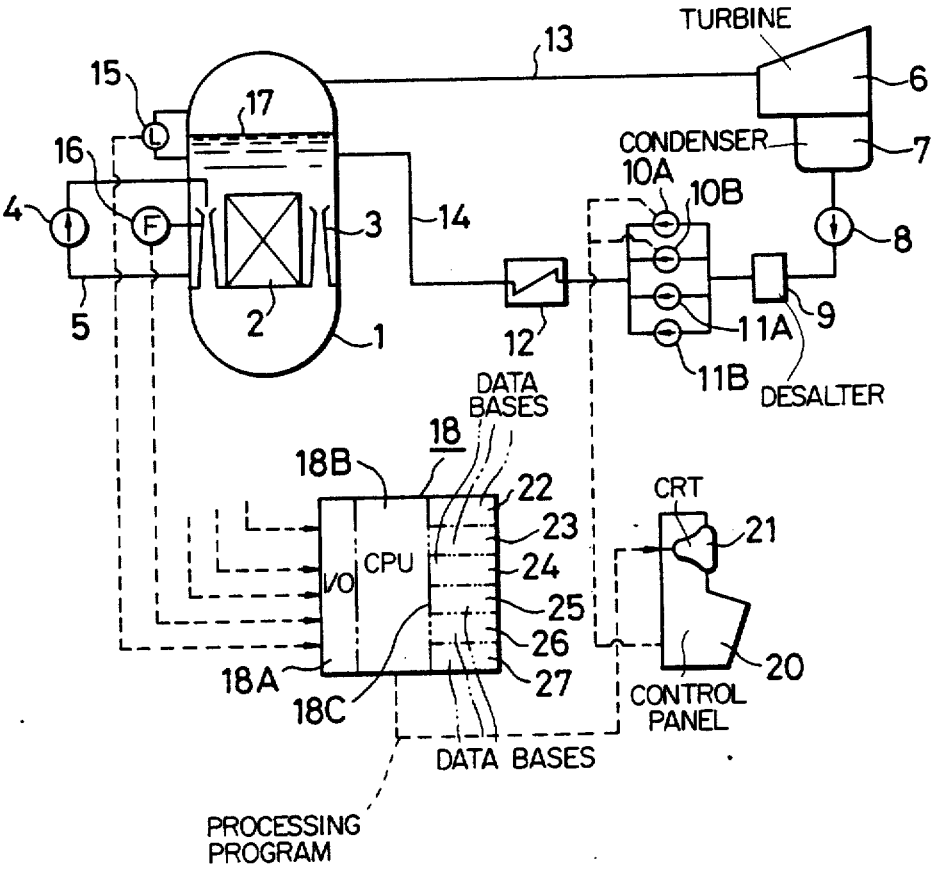
FIG. 1 is a system diagram of an apparatus for putting a plant operating method into practice which is given in one preferred embodiment of this invention to apply on a boiling water reactor plate.

A plant operating method which is given in one preferred embodiment of this invention to apply on a boiling water reactor plant will now be described with reference to FIG. 1.

Steam generated at a core 2 in a reactor pressure vessel 1 is sent to a turbine 6 by way of a main steam pipe 13 and then condensed in a condenser 7 to water. The water is supplied into the reactor pressure vessel 1 as a cooling water by way of a feed-water piping 14. The feed-water piping 14 connects a condensate pump 8, a desalter 9, feed-water pumps 10A, 10B, 11A and 11B and a feed-water heater 12 from the upstream side in that order. The feed-water pumps 10A, 10B, 11A and 11B are of motor-driven type. The feed-water pumps 11A and 11B are driven temporarily for start-up and shutdown of a reactor but left in stanby for backup of the feed-water pumps 10A and 10B during a normal operation of the reactor. The feed-water pumps 10A and 10B are driven all the time during operation of the reactor. The cooling water coming into the reactor pressure vessel 1 is sent to the core 2 by way of a jet pump 3 by a recirculating pump 4 which is provided on a recirculating system piping 5.

A water gauge 15 detects a water level (reactor level) 17 in the reactor pressure vessel 1. A flow meter 16 detects a discharge flowing in the jet pump 3. The sum of all discharges flowing in the jet pump 3 will indicate a quantity of the cooling water flowing in the core 2. The process amount including the reactor level 17 and the jet pump discharge which are measured on various detectors is inputted to a central processor 18B of an electronic computer 18 by way of a process input/output unit 18A of the electronic computer 18. The electronic computer 18 has a memory (internal memory and external memory) 18C, besides. A consequence processed on the central processor 18B is displayed on a Braun tube (or CRT) 21 provided on a control panel 20.

The present embodiment comprises obtaining an operation guide for the above reactor plant abnormality through utilizing a technique of knowledge engineering, carrying out an operation at the time of abnormality occurrence according to the guidance, thereby coping with an abnormal state of the reactor plant. Such operating method will be described as follows. The memory 18C of the electronic computer 18 stores a cause-consequence data base 22, a transition forecast data base 23, an operation data base 24, a detail data base 25, a case data base 26 and a processing program 27.

The cause-consequence data base 22 is that in which the relation of cause and [effect] *consequence* is recorded which comprises combining a cause *or a premise* and a consequence *or a conclusion* to be determined directly related to the cause *as a rule*. This is a data storing area which corresponds to that of the general "rule" as termed by people who research knowledge engineering *and which may be considered as a knowledge base storing area*. An example of the cause-consequence data base 22 in a boiling water reactor plant is shown in FIG. 2.

The transition forecast data base 23 is a data base for storing information to build up a data of the cause-consequence data base 22 in accordance with the lapse of time. Stored herein are information on the operating state of each equipment of the plant and the state of each process amount and a technique to obtain, for the process amount for which a value representing the state has been obtained, a time to change the value and a value after a certain time passes. An example of the transition forecast data base 23 in a boiling water reactor plant is shown in FIG. 3.

FIG. 4 represents an example of the operation data base 24 in a boiling water reactor plant. The operation data base 24 is a data base for adding a combination of a condition division and an operation plan with a combination of the state of each process amount and the operating state of each equipment of the plant as the condition division and an operation then conceivable as the operation plan.

The detail data base 25 is a data base for recording a detail operating method and operating limit of each equipment of the plant.

The case data base 26 is a data base for enclosing a consequence of prior analysis and a record at the time of past operation.

The detail data base 25 and the case data base 26 in a boiling water reactor plant are shown in FIG. 5 and FIG. 6, respectively.

Figure 7:
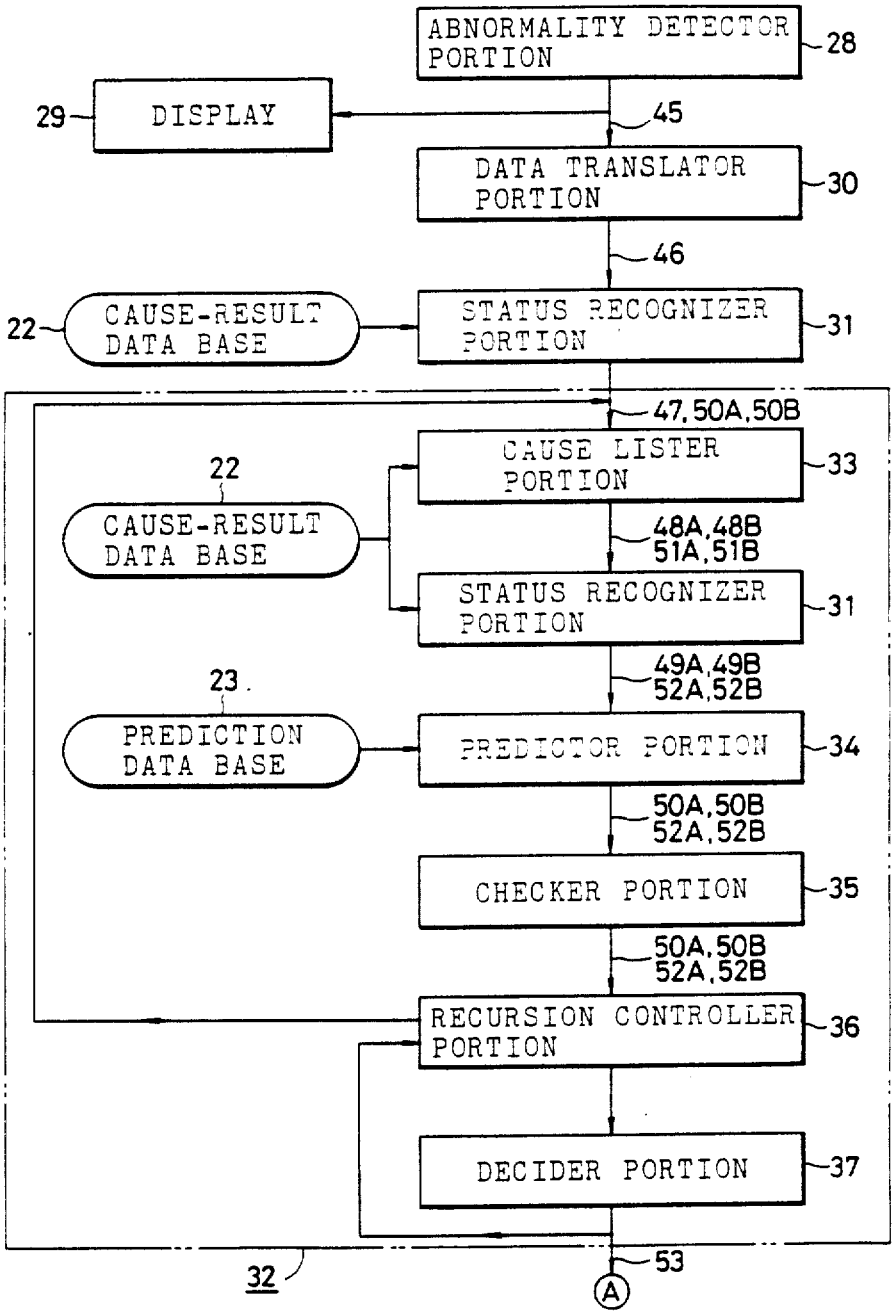
FIG. 7 and FIG. 8 are flowcharts of a processing program shown in FIG. 1.
Figure 8:
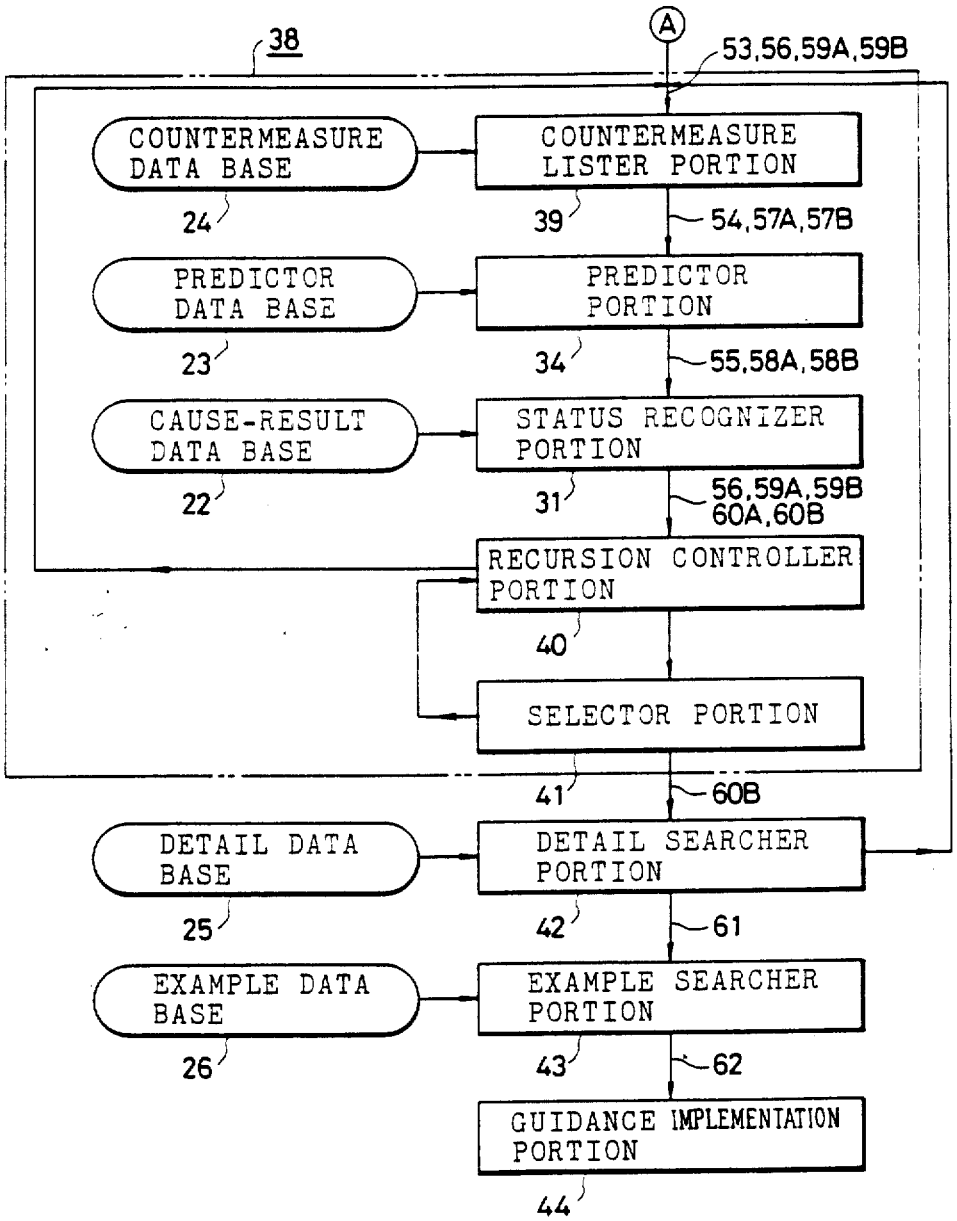

An example of the processing program 27 will be described with reference to FIG. 7 and FIG. 8. The processing program 27 consists of an abnormality detector portion 28, a data translator portion 30, a status recognizer portion 31, a cause decision division 32, an optimal operation determination division 38, a detail searcher portion 42, an example searcher portion 43 and a guidance implementation portion 44. The cause decision division 32 has a cause lister portion 33, a status recognizer portion 31, a predictor portion 34, a checker portion 35, a recursion controller portion 36 and a decider portion 37 of the cause decision division 32. Further, the optimal operation determination division 38 has countermeasure lister portion 39, a predictor portion 34, a status recognizer portion 31, a recursion controller portion 40 and a selector portion 41 of the optimal operation determination division 38.

Figure 9:
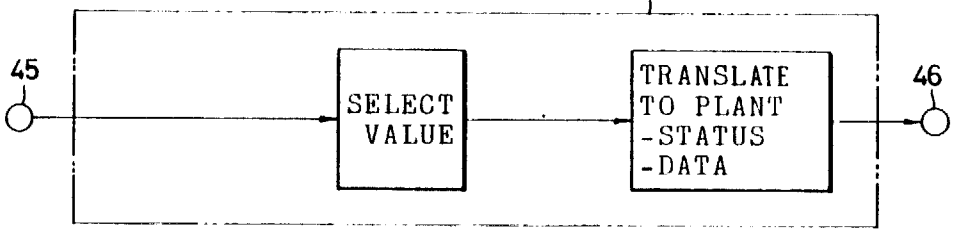
FIG. 9 is a block diagram of a data conversion division shown in FIG. 7.

The data translator portion 30 inputs a plant data which comes in a measured process amount, unifies values of each plant data through a logical decision like majority decision, obtains a member state or status (an item to indicate one state of the plant) through combining an identifier for the plant data and a consequence transformed into a special value in an apparatus to obtain a guidance for plant operation which indicates a value of the plant data in the processing given below (hereinafter referred to as "operation guide apparatus"), and then outputs these member states in a plant state signal. A flowchart of the data translation portion 30 is shown in FIG. 9.

Figure 10:
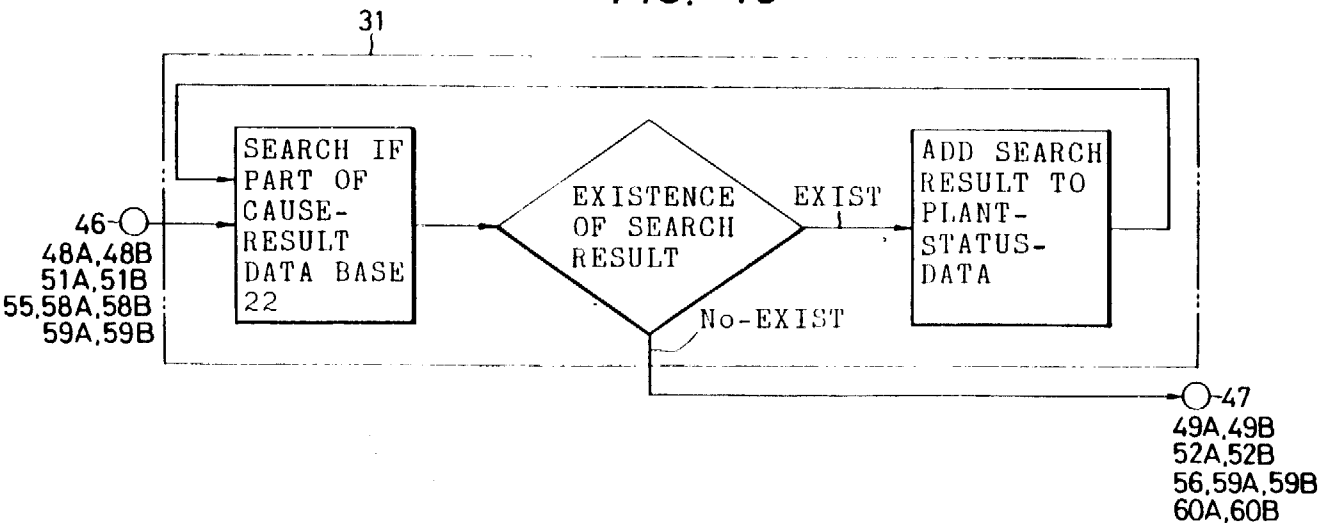
FIG. 10 is a block diagram of a state grasp division shown in FIG. 7.

The status recognizer portion 31 compares each "cause" enclosed in the cause-consequence data base 22 with the inputted plant state signal and selects a "consequence" to come out according to the "cause" corresponding to the plant state signal. Then, the selected consequence is added to the inputted plant state signal as a new member state. A flowchart for the status recognizer portion 31 is shown in FIG. 10.

Figure 11:
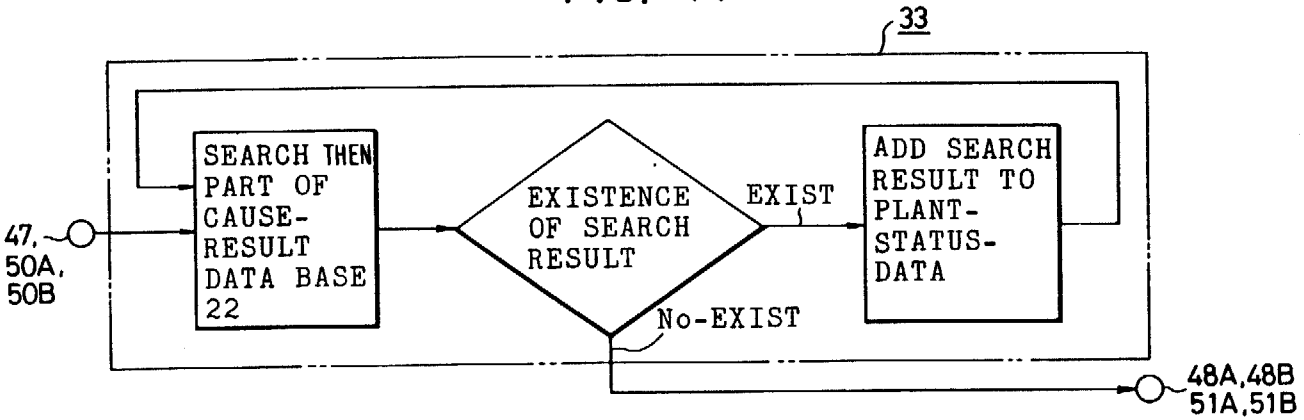
FIG. 11 is a block diagram of a cause enumeration division shown in FIG. 7.

The cause lister portion 33 obtains a member state capable of causing each member state of the inputted plant state signal or a combination thereof through retrieving the "consequence" enclosed in the cause-consequence data base 22, thus outputting a retrieved ["consequence"] *"cause"*. The flowchart is shown in FIG. 11.

Figure 12:
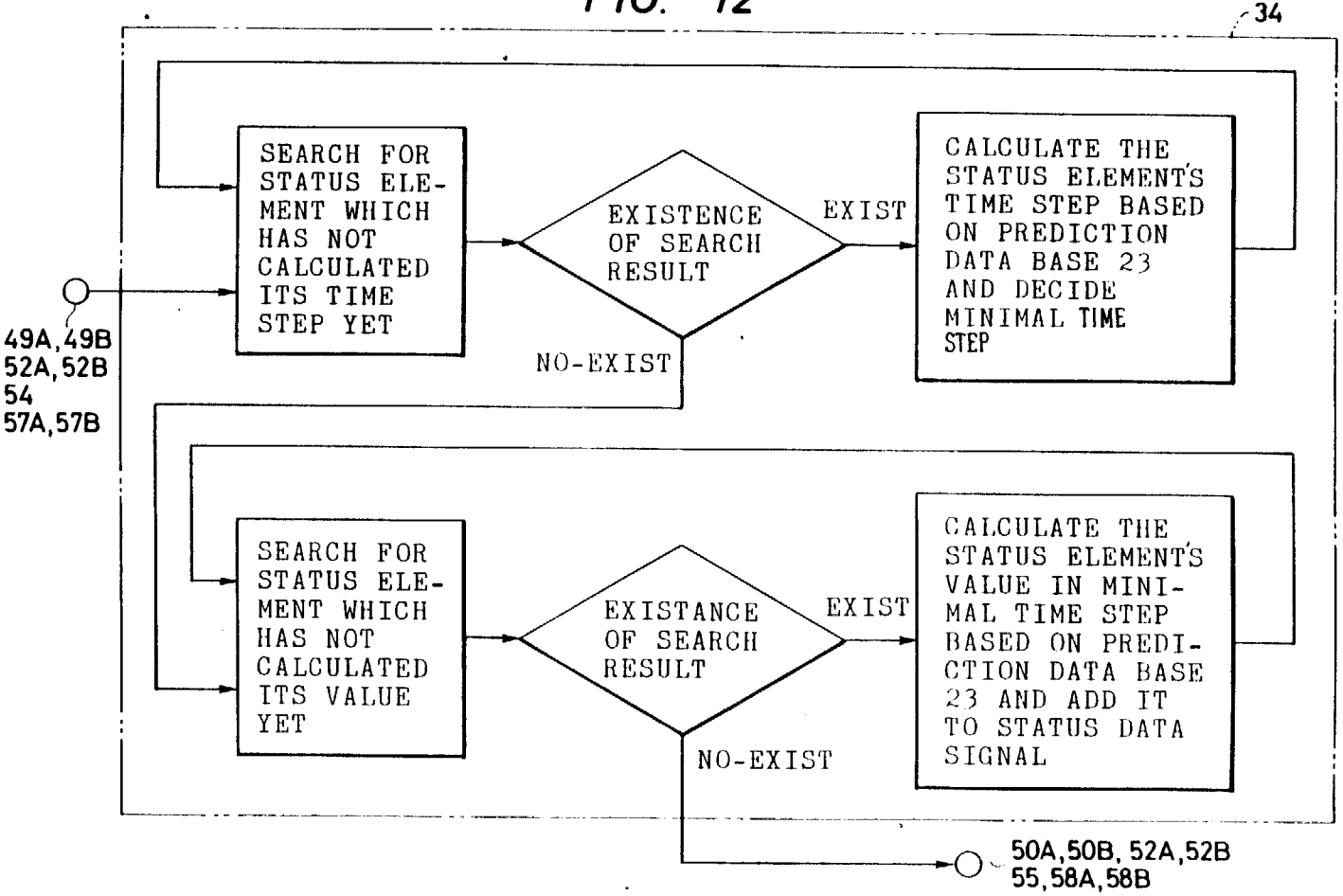
FIG. 12 is a block diagram of a forecast division shown in FIG. 7.

The predictor portion 34 inputs the plant state signal and obtains the time until values of each member state of the inputted plant state signal change to those of the next level through executing a calculating technique (program) stored in the prediction data base 23. Next, it selects the shortest time of those obtained as above and obtains the value of each member state after passing the shortest time also through executing the calculating technique stored in the prediction data base 23. Each member state is then unified and outputted as a plant state signal for the next step. A flowchart of the precitor portion 34 is shown in FIG. 12.

Figure 13:
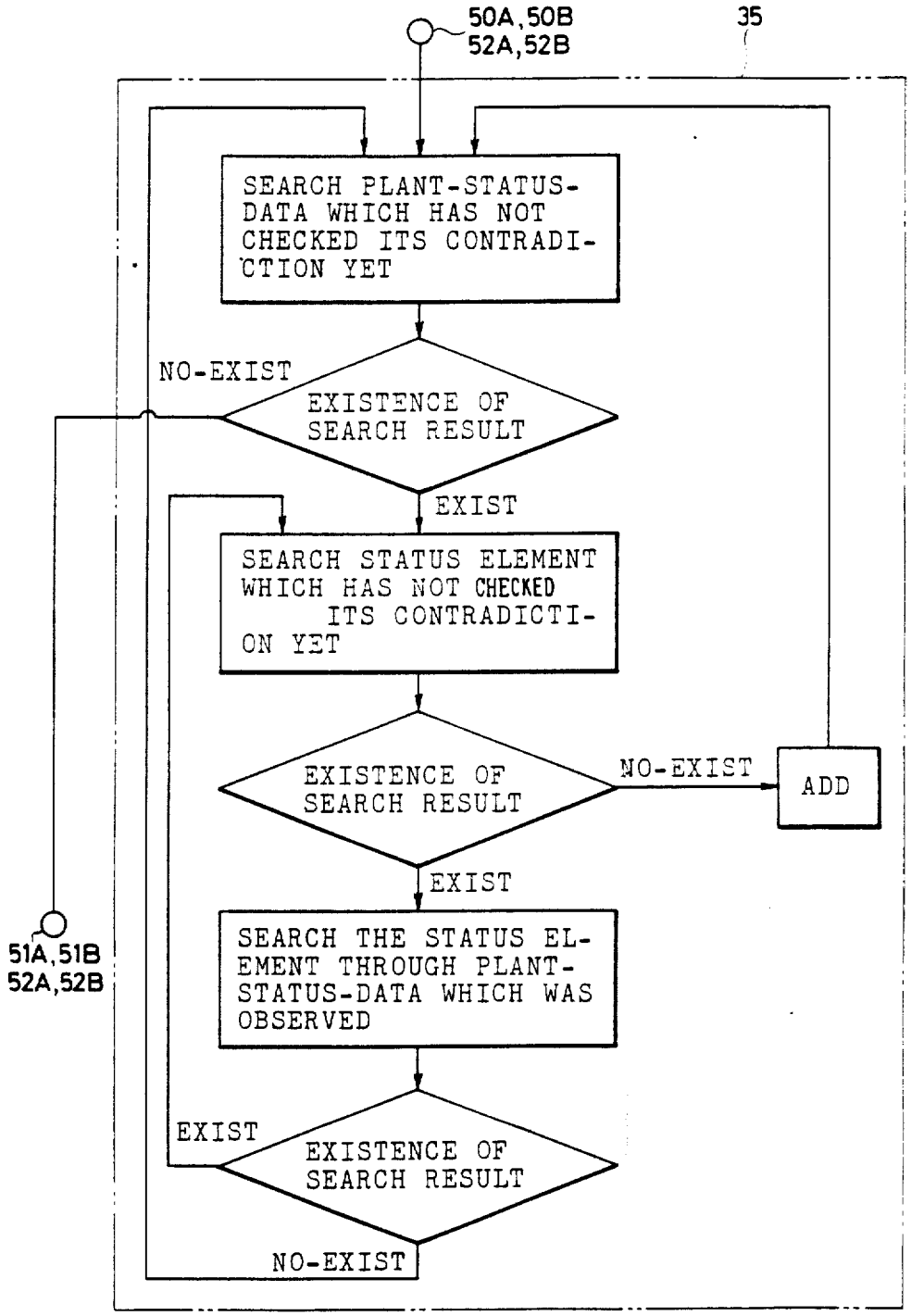
FIG. 13 is a block diagram of a non-contradiction confirmation division shown in FIG. 7.

The checker portion 35 inputs a reference plant state signal and a single or plural plant state signal for which non-contradiction is confirmed and outputs a plant state signal not included in the original plant state signal and not including a member state taken in by the data translator portion 30. FIG. 13 shows a flowchart of the non-contradiction confirmation division 35.

Figure 14:
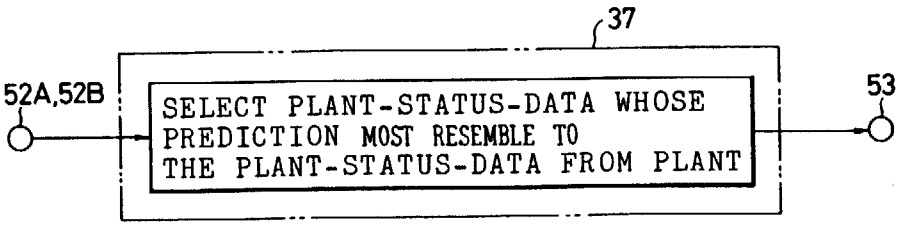
FIG. 14 is a block diagram of a decision division shown in FIG. 7.

The decider portion 37 inputs a plurality of plant state signals and outputs a plant state signal including each member state most approximate to each member state constituting the plant state signal inputted to the cause decision division 32. FIG. 14 shows the contents.

Figure 15:
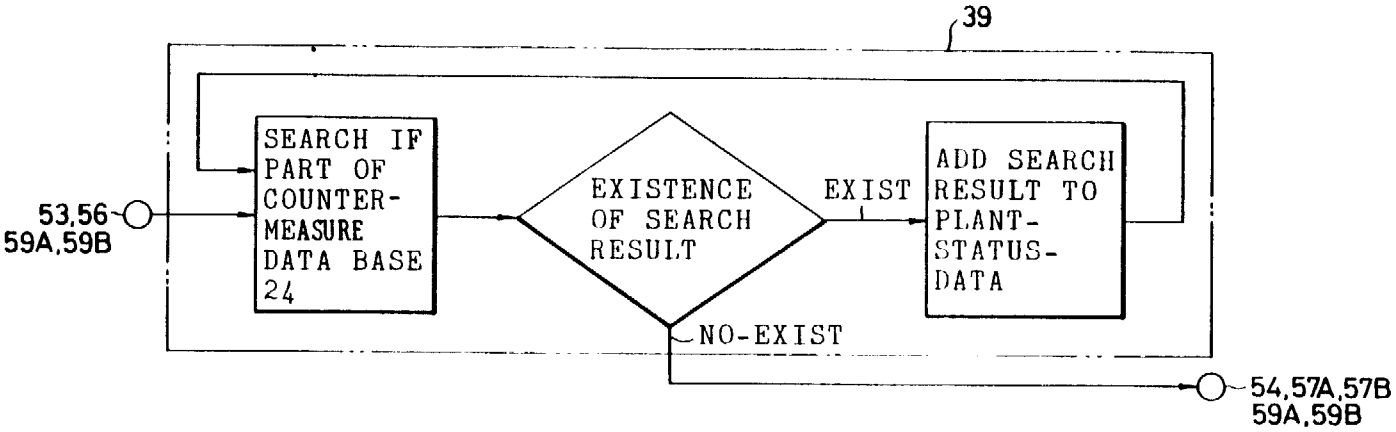
FIG. 15 is a block diagram of an operation enumeration division shown in FIG. 8.

The countermeasure lister portion 39 inputs a plant state signal and lists to output operation plans then conceivable by retrieving the condition division of the countermeasure data base 24. A flowchart of the countermeasure 39 is shown in FIG. 15.

Figure 16:
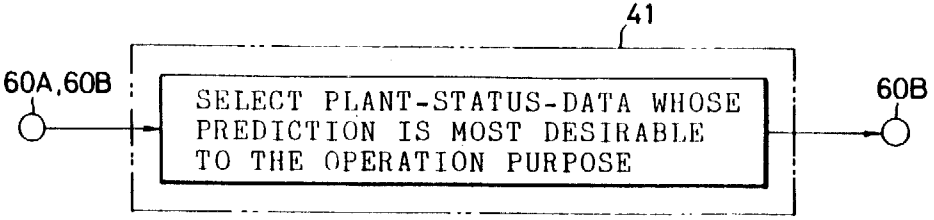
FIG. 16 is a block diagram of a determination division shown in FIG. 8.

The selector portion 41 inputs a plurality of plant state signals, as hsown in FIG. 16, and outputs the plant state signal most approximate to the operation object then prevailing.

The cause decision division 32 inputs a plant state signal at the time of a plant abnormality, actuates the cause lister portion 33, the status recognizer protion 31, the prediction portion 34, the checker portion 35, the recursion controller portion 36 and the decider portion 37 to decide a cause of the plant abnormality, and then outputs the plant state signal to which the cause is added. The plant state signal outputted from the cause decision division 32, actuates the countermeasure lister portion 39, the predictor portion 34, the status recognizer portion the recursion controller portion 40 and the selector portion 41 to determine an optimal operating method, and outputs the plant state signal to which a consequence obtained through executing the operation is added.

Figure 17:
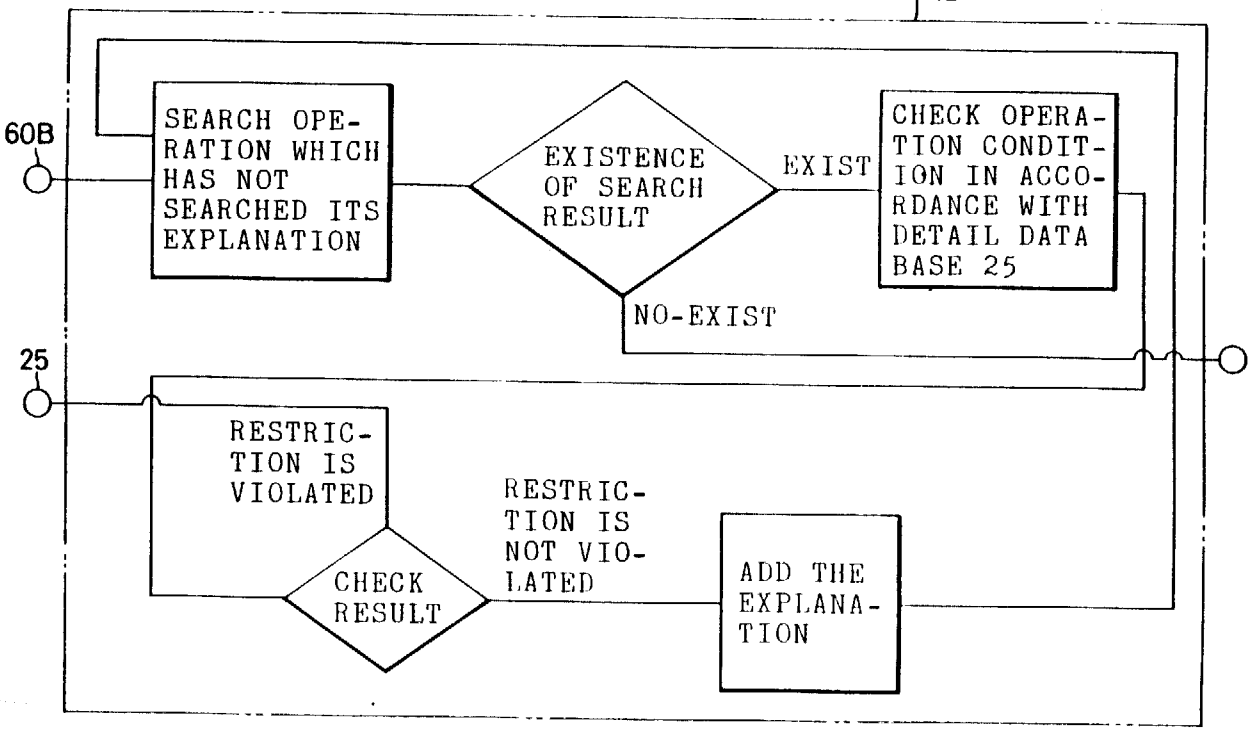
FIG. 17 is a block diagram of a particularization division shown in FIG. 8.

The detail searcher portion 42 inputs the plant state signal outputted from the optimal operation determination division 38 and retrieves what signifies an operation of the equipment of the plant according to each member state of the plant state signal. And after ensuring that the retrieved operation satisfies an operation limit of the detail data base 25, it adds a detail operation procedure to the plant state signal. Where the retrieved operation does not meet the operation limit of the detail data base 25, it reruns the optimal operational determination division 38. A flowchart of the detail searcher portion 42 is shown in FIG. 17.

The example searcher portion 43 inputs the plant state signal outputted from the detail searcher portion 42, retrieves a cause and a keyword of the case data base 26 and adds that in which the cause coincides or the keyword coincides with a member state of the plant state signal at a constant rate or over to the plant state signal as an analogous case.

The guidance implementation portion 44 inputs the plant state signal outputted for the example searcher portion 43 and changes the format to output it to CRT 21.

An operating method of a boiling water reactor plant on an apparatus having the above-mentioned features will be described as follows.

While such a phenomenon will not be conceivable actually, the phenomenon wherein a shaft of the recirculating pump 4 to feed a cooling water to the core 2 happens to adhere during operation of the boiling water reactor plant is premised for description. When the shaft is adherent as mentioned, the quantity of a cooling water flowing in the core 2 decreases and a void in the core 2 increases. The increase in void may lead to an ascent of the reactor level 17. Actually, a phenomenon of the shaft adherence and the void increase is not apparent but a process amount of the measured reactor level and the jet pump discharge is only known. The reactor level 17 normally comes at a level L4. When the reactor level 17 reaches a level L8, the reactor is shut down urgently (scram). When the reactor level 17 reaches a level L7 immediately before the scram, an indication is given to that effect on the control panel 20. An operator is thus acquainted with an ascent of the reactor level. A plant data representing a process amount of the reactor level 17 and the jet pump discharge is inputted to the central processor 18B by way of the input/output unit 18A. The inputted plant data is then subjected to an analog-digital conversion so as to serve well for a processing in the central processor 18B. Upon inputting the plant data, the central processor 18B calls the processing program 27 (FIG. 7 and FIG. 8) which is an operation guide apparatus in the memo 18C and performs a given processing according to the processing program 27. The abnormality detector portion 28 determines a plant data indicating an abnormal value of those which are inputted. When the plant data indicating an abnormal value (the reactor level 17 reaching L7 level in the case of this embodiment) is present, a command 29 is outputted and contents of the abnormality are displayed on the control panel 20. When there is present further such plant data indicating an abnormal value, the processing after the data translator portion 30 of the processing program 27 is executed.

One or plural plant data 45 measured at the boiling water reactor plant is inputted to the data translator portion (FIG. 9) 30. Such data as will not satisfy a set point (exceeding or coming lower) are all selected from the plant data 45 and then converted into a plate state signal 46. The data translator portion 30 outputs the plant state signal 46 shown in FIG. 20.

In the boiling water reactor plant, a plural detectors are provided for an important process amount like reactor level. Therefore, it must be ensured that the measured results are coincident with each other. If not, then an erroneous value measured on the detector which is so given through a majority decision is prevented from being inputted to the operation guide apparatus.

In FIG. 21, contents are given in ordinary characters, however, EBCDIC character code or integral number can be used practically.

The plant state signal 46 which is an output of the data translator portion 30 is inputted to the status recognizer portion (FIG. 10) 31, which portions supplements information, if any, which is missing with the plant state signal 46 shown in FIG. 20. Namely, the cause division of the cause-consequence data base 22 shown in FIG. 2 is retrieved according to each member state of the inputted plant state signal 46. Next, a decision is made on the retrieved result, and if "YES", the retrieved result is added to the plant state signal 46. After that, the cause division of the cause-consequence data base 22 is again retrieved. A decision is made on the retrieved result, and if "NO", then a plant state signal 47 to which the above-mentioned retrieved result is added is outputted. There is nothing to add in this embodiment, and the plant state signal 47 similar to that of FIG. 20 which is shown in FIG. 21 is outputted. In the embodiment, input and output of the status recognizer portion 31 are identical.

Since the time of occurrence of the abnormality is assumed for operation of the embodiment, a processing of the cause decision division 32 is executed by inputting the plant state signal 47.

The plant state signal 47 is inputted first to the cause lister portion 33 in the cause decision division 32. With each member state of the plant state signal 47 as a "consequence", the cause lister portion 33 retrieves the member state of the plant state signal 47 from a consequence division of the cause-consequence data base 22 (FIG. 2) and adds an item of the cause division coping with the member state to the plant state signal 47. Namely, the member state of the plant state signal 47 indicates "reactor level=L7" and "jet pump discharge decreasing". Where the member state is present in two or more, the member state higher in importance is subjected to retrieval. An importance of the member state is specified beforehand. In this embodiment, "reactor level=L7" is more important and hence is subjected to retrieval. "Reactor level=L7" is so given as a consequence of the reactor level having ascended, therefore "reactor level ascending" is retrieved from the consequence division of the cause-consequence data base 22, and "void increase" and "feed water flow increase" which are items of the cause division corresponding thereto are added to the plant state signal 47. The consequence division of the cause-consequence data base 22 is again retrieved. However, nothing will be retrieved. Next, a decision is made on the retrieved consequence. Since nothing can be retrieved in this case, the cause lister portion 33 outputs plant state signals 48A and 48B to which "void increase" and "feed water low increase" are added as shown in FIG. 22A and FIG. 22B.

The status recognizer portion 31 retrieves items of "void increase" and "feed water flow increase" from the cause division of the cause-consequence data base 22 by inputting the plant state signals 48A and 48B and obtains "reactor water level rise" which is an item of the consequence division corresponding thereto. Then, plant state signals 49A and 49B with the above added thereto are outputted. The plant state signals 49A and 49B are inputted to the predictor portion 34 (FIG. 12).

A transition of the plant state when the void increases and the feed water flow increases from a combination of "cause" and "consequence" enclosed in the cause-consequence data base 22 can be forecasted by using the predictor portion 34. The predictor portion 34 retrieves a member state in the plant state signals 49A and 49B for which a change time is not calculated and calculates the time in which each retrieved member state changes until there is no member state to be retrieved. The time in which the retrieved member state changes refers to a time required for the member state to change from the current level to the next level (the next level being L7 to the current level L6 in the reactor level). Next, whether or not the change time thus obtained is minimum will be decided. A change time for "reactor water level increase" to each of "void increase" and "feed water flow increase" of the plant state signals 49A and 49B is obtained according to the calculating method (time calculating method) shown in the predictor data base 23 of FIG. 3. Then, each member state after the minimum change time thus obtained passes is calculated according to a technique (state calculating method) of the predictor data base 23. The predictor portion 34 outputs plant state signals 50A, 50B with a new plant state signal added which is shown in FIG. 23A and FIG. 23B. A change of the phenomenon arising according to "cause" specified by the cause lister portion 33 (or "consequence" retrieved by the status recognizer portion 31 of the cause decision division 32), which will be brought as time passes can be obtained by the predictor portion 34. A decision on whether or not the "cause" estimated by the cause lister 33 is a true cause will thus be facilitated, even if an abnormality occurs with a dynamic process amount of the boiling water reactor plant. In other words, the true cause which brings a plant data indicating the abnormality measured actually at the boiling water reactor can be obtained easily thereby.

The checker portion 35 shown in FIG. 13 which has inputted the plant state signals 50A and 50B ensures that the plant state signal produced in consequence does not include a member state which is not present in the plant state actually produced and for which the cause is not estimated by the cause lister portion 33 itself. The confirmed plant state signal is outputted as it is, however, that of having produced a member state which is not present in the actual plant state but taken in by the data translator portion 30 as a consequence is regarded improper as a cause and hence is not outputted. In this embodiment, the state signals 50A and 50B of FIG. 23A and FIG. 23B are not contradictory and outputted as they are from the non-contradiction checker portion 35.

Figure 24A:
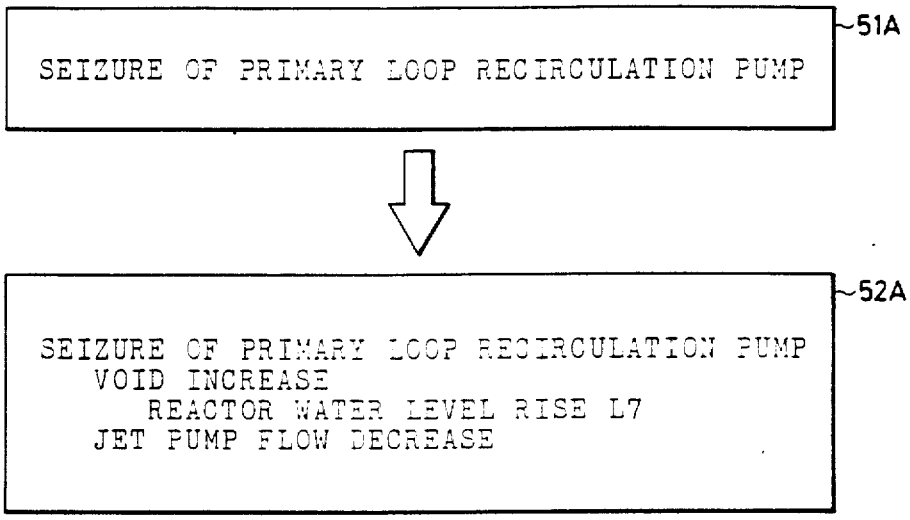
FIG. 24A and FIG. 24B are explanatory drawings of a plant state signal outputted from the cause enumeration division and the state grasp division of the cause decision division called recursively.
Figure 24B:
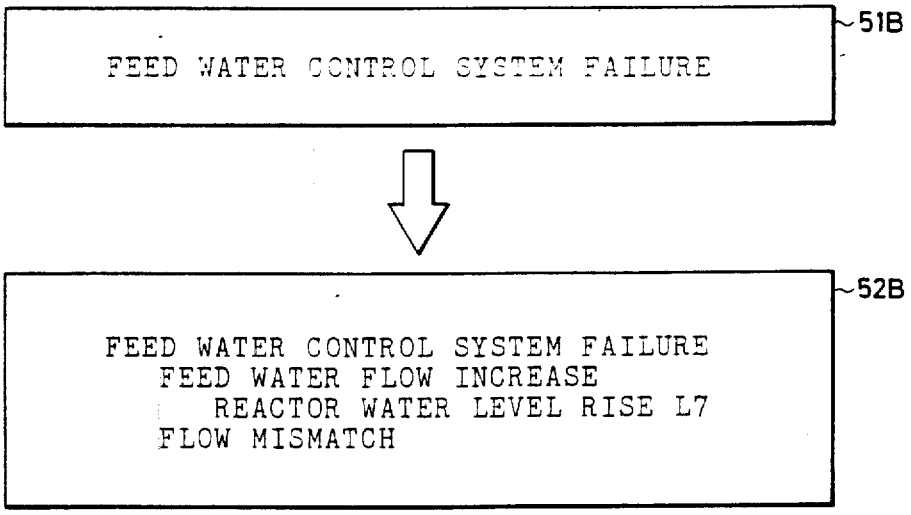

The plant state signals 50A, 50B outputted from the checker portion 35 are inputted to the recursion controller portion 36. The recursion controller portion 36 compares the plant state signals 50A and 50B which are outputs of the checker portion 35 with the plant state signal 47 outputted to the cause decision division 32. Where either one member state of the plant state signals 50A and 50B coincides with the plant state signal 47, the recursion controller portion 36 will not function. In this case, the plant state signals 50A and 50B are transferred to the decider portion 37. In this embodiment, a member state "jet pump flow decrease" is included in the plant state signal 47 but not included in both the plant state signals 50A and 50B. The recursion controller portion 36 therefore calls recursively the cause decision division 32 for which the plant state signals 50A and 50B work as inputs. Namely, the processing from the cause lister portion 33 to the checker portion 35 is rerun. The plant state signals 50A and 50B are inputted to the cause lister portion 33. The cause lister portion 33 retrieves the consequence division of the cause-consequence data base 22 with the member states "void increase" and "feed water flow increase" of the plant state signals 50A and 50B as "consequence", thereby obtaining "cause" corresponding thereto. Seizure of primary loop recirculation pump" indicated by 51A in FIG. 24A is retrieved for the former; "feed water control system failure" indicated by 51B in FIG. 24B is retrieved for the latter. Plant state signals 51A and 51B with these member states added to the plant state signals 50A and 50B are outputted from the cause lister portion 33. The The status recognizer portion 31 retrieves all "consequences" coming from the "cause" of member states of the plant state signals 51A and 51B from the cause-consequence data base 22. "Jet pump flow decrease" is retrieved for "seizure of primary loop recirculation pump" of the plant state signal 51A in addition to "void increase", and "flow mismatch" is retrieved for "feed water control system failure" of the plant state signal 51B in addition to "feed water flow increase". Each plant state signal 52A and 52B (FIG. 24A and FIG. 24B) to which these member states are added are outputted from the status recognizer portion 31 and inputted to the predictor portion 34. No change will be brought on the plant state signal from forecasting the transition of the plant state signals 52A and 52B as mentioned by the predictor portion 34, and hence they are inputting straight to the checker portion 35. The are also decided as not contradictory here and outputted straight accordingly.

The plant state signals 52A and 52B outputted from the checker portion 35 are inputted to the recursion controller portion 36. As described hereinabove, the recursion controller portion 36 compares the plant state signal 47 with the plant state signals 52A and 52B. The two member states reactor level L7" and "jet pump flow decrease" of the plant state signal 47 are also present in the plant state signal 52A. The recursion controller portion 36 therefore does not carry out a recursive call of the cause decision division 32 and outputs the plant state signals 52A and 52B to the decider portion 37.

The decider portion 37 compares the plant state signals 52A and 52B shown in FIG. 24A and FIG. 24B respectively with the plant state signal 47 of FIG. 21 which indicates an actual plant state of the boiling water reactor plant.

Where "seizure of primary loop recirculation pump" is the cause, the plant state signal 52A coincides with the plant state signal 47. However, where "feed water control system failure" is the cause, the plant state signal 52B does not coincide with the plant state signal 47. Therefore, "seizure of primary loop recirculation pump" is decided as the cause, and the plant state signal 52A shown in FIG. 24A is outputted as a plant state signal 53 which is an output of the cause decision division 32. The processing on the cause decision division 32 is thus closed.

Since there exists the recursion controller portion 36, it can easily be decided whether or not the plant state resulting from the "cause" estimated according to this embodiment will be identified with a plant state indicating abnormality occurring at the boiling water reactor plant. Therefore, a true "cause" for the plant state indicating abnormality can be obtained simply and precisely.

A feature to decide whether or not a recursive call will have to be carried out through comparing a member state of the first plant state signal inputted to the cause decision division 32 with a member state of the second plant state signal outputted from the checker portion 35 can be placed on the front stage of the recursion controller portion 36 separately from the recursion controller portion 36. In case the member state of the second plant state signal coincides with a part of the member state of the first plant state signal and a new cause is not retrieved at the cause lister portion 22 after recursive call, it is taken that an abnormal phenomenon due to a different cause has occurred in two or more (multiple phenomenon). In such case, a cause to produce the member state of the first plant state signal after the member state of the second plant state signal is eliminated from that of the first plant state signal is obtained at the cause decision division 32 similarly as mentioned hereinabove.

The plant state signal 53 (the plant state signal 52A essentially this time) which is an output of the decider portion 37 of the cause decision division 32 is inputted to the countermeasure lister portion 39 of the optimal operation determination division 38. The countermeasure lister portion 39 retrieves the condition division of the countermeasure data base 24 for each member state of the plant state signal 52A and obtains an operation plane corresponding to the item of the condition division. In this embodiment, the corresponding item is not present in the condition division of the countermeasure data base 24, as "reactor level L7". Therefore, there is no concrete operation plan in this case, and a plant state signal 54 with the operation plan "nothing operated" added to the plant state signal 53 is outputted from the countermeasure lister portion 39.

Next, the predictor portion 34 will function from inputting the plant state signal 54. The predictor portion 34 outputs a plant state signal 55 to which the change time of each member state of the plant state signal 54 and each member state after the minimum change time passes are added. Concretely, a state changing at the minimum change time is the reactor level, and a member state after passing the minimum time is the "reactor water level rise, L8". The plant state signal 55 to which the member state is added is outputted from the predictor portion 34.

The plant state signal 55 is inputted to the status recognition portion 31. The status recognition portion 31 retrieves a consequence "turbine trip" to the member state "reactor level rise, L8" which is added newly according to the cause-consequence data base 22. The state grasp division 31 further retrieves consequences "scram: switch electric bus and "reactor pressure rise" to the cause of retrieved member state "turbine trip". A plant state signal 56 (FIG. 25) to which these new member states are added is the output of the status recognition portion 31.

The plant state signal 56 is inputted to the recursion controller portion 40. The portion 40 has a means to compare the plant state signal inputted to the countermeasure lister portion 39 with the plant state signal outputted therefrom, thereby deciding whether or not a new operation plan is added to the latter signal. Upon deciding that a new operation plan has been added, the recursion controller portion calls the optimal operation determination division 38 recursively, however, if the decision comes contrary thereto, then the recursive call will not be carried out. The operation plan "no operation carried out" is given in this embodiment, therefore a recursive call is made to the optimal operation determination division 38, and a processing is again effected on the countermeasure lister portion 39, the predictor portion 34 and the status recognition portion 31, each. The plant state signal 56 which is an output of the status recognition portion 31 is inputted to the countermeasure lister portion 39.

The countermeasure lister portion 39 inputs the plant state signal 56 and retrieves an operation plan to cope with the member state of this signal from the countermeasure data base 24. In this embodiment, an operation "motor driven feed water pump trip" corresponding to "reactor level rise, L8" is retrieved, and further "no operation carried out" is enumerated as an operation plan. Plant state signals to which these operation plans are added, i.e. plant state signals 57A and 57B shown in FIG. 26A and FIG. 26B respectively are inputted to the predictor portion 34. A transition of the plant state when each operation is carried out is forecasted by the predictor portion 34 as mentioned above. Namely, consequences of "reactor pressure rise, high" and "reactor level suddenly decreasing, L4" will be forecasted after the minimum change time passes further from the minimum change time obtained through the previous processing of the predictor portion 34 by executing "motor driven feed water pump trip" of the plant state signal 57A. "Reactor pressure rise, high" and "reactor water level fall, L6" will also be forecasted in the case of "no operation carried out". Plant state signals 58A and 58B to which these member states are added are inputted to the status recognition portion 31 from the predictor portion 34.

The status recognition portion 31 retrieves a "consequence" corresponding to each member state from the cause-consequence data base 22. Namely, for the plant state signal 58A having an operation plan "motor driven feed water pump trip", a consequence "bypass valve open" to the cause "reactor pressure high", a consequence "reactor water level low" to the cause "motor driven feed water pump trip", a consequence "void decrease" to the cause "scram (after a given time passes)" (since the minimum change time passed two times after scram), and a consequence "reactor level fall" to the cause "void decrease" are retrieved. A plant state signal 59A of FIG. 26A to which these retrieved consequences are added is obtained through processing of the status recognition portion 31. Then, for the plant state signal 58B having an operation plan "no operation carried out", the consequence "bypass valve open" to the cause "reactor pressure high", the consequence "void decrease" to the cause "scram (after a given time passed)", and the consequence "reactor level fall" to the cause "void decrease" are retrieved. A plant state signal 59B of FIG. 26B to which these retrieved consequences are added is obtained through processing of the status recognition portion 31.

The plant state signals 59A and 59B are inputted to the recursion controller portion 40. The portion 40 determines whether or not the optimal operation determination division 38 will have to be called recursively again according to whether or not the above-mentioned new operation plan has been added in the processing of the countermeasure lister portion 39 after recursive call. Since "motor driven feed water pump trip" is added as a new operation plan this time, a recursive call of the optimal operation determination division 38 is rerun. The plant state signals 59A and 59B are inputted to the countermeasure lister portion 39. However, the portion 39 does not add an operation plan newly to those of plant state signals 59A and 59B. Next, the predictor portion 34 inputs the plant state signals 59A and 59B outputted from the countermeasure lister portion 39 to forecast a state of each member state of the plant state signals after the minimum change time passes. Namely, for the plant state signal 59A having an operation plan "motor driven feed water pump trip", the reactor level is changed to "L2" and the reactor pressure is changed to "descending". Then, for the plant state signal 59B having an operation plan "no operation carried out", the reactor level is changed to "L4" and the reactor pressure is changed to "descending". The predictor portion 34 outputs plant state signals 60A and 60B shown in FIG. 27A and FIG. 27B for each operation plan.

The plant state signals 60A and 60B are inputted to the recursion controller portion 40. Since nothing is added newly at the countermeasure lister portion 39, a recursive call is not carried out this time. Therefore, the plant state signals 60A and 60B are inputted to the selected portion 41. The selector portion 41 selects either one of the plant state signals 60A and 60B as an optimal operation. Namely, "reactor level L2" will result from carrying out "motor driven feed water pump trip" of the plant state signal 60A, and "reactor level L4" will result from carrying out "no operation carried out". "No operation carried out" will be most pertinent to "seizure of primary loop recirculation pump" this time, thereby complying with the operation condition of the boiling water reactor plant, "not to drop reactor level". Therefore, the plant state signal 60B of FIG. 27B is outputted from the optimal operation determination division.

The predictor portion 34 is provided at the optimal operation determination division 38 in this embodiment, therefore when an operation (retrieved by the countermeasure lister portion 39) to dissolve the true cause of an abnormal state obtained at the cause decision division 32 is carried out, the future plant state which will be so obtained through carrying out the operation can be forecasted. In other words, the value of a dynamic process amount in the future can be forecasted. Moreover, the recursion controller portion 40 is also provided at the optimal operation determination division 38, therefore an optimal operation can easily be determined in consideration of the future plant state obtained at the predictor portion 34. According to this embodiment, an abnormal state occurring currently at the boiling water reactor plant can be dissolved easily, and an optimal operation high in safety can be selected, too. Further in the embodiment available by combining the cause decision division 32 having the predictor portion 34 and the recursion controller portion 36 with the optimal operation determination division 38 having the predictor portion 34 and the recursion controller portion 40, since the true cause of an abnormal state can be precisely recognized, the operation obtained for dissolving the abnormal state might be the best possible one. Furthermore, a correct cause can be found thereby, therefore whether or not the plant must be repaired immediately can be decided efficiently, a spot to repair can be detected beforehand for necessary repair, if any, and the repair after shutdown of the plant can be effected within a short period of time.

The plant state signal 60B outputted from the selector portion 41 of the optimal operation determination division 38 is inputted to the detail searcher portion 42. In this embodiment, the optimal operation being "no operation carried out", the detail searcher portion 42 does not function. The detail searcher portion 42 outputs the plant state signal 60B as an output (a plant state signal 61) of the detail searcher portion 42. For example, in case "motor driven feed water pump trip" of the plant state signal 60A is carried out and thus a high pressure injection system is operated by "reactor level L2" of the plant state signal 60A, a detail operating method (FIG. 5) of the high pressure injection system is picked out of the detail data base 25, and a plant state signal to which the above is added is outputted from the detail searcher portion 42. And where there is observed an offense from carrying out a close confirmation on the operation limit, a plant state signal to which "high pressure injection system cannot be used" is added is outputted, the output is then transferred to the optimal operation determination division 38 to rerun the above-mentioned processing of the optimal operation determination division 38, and a planning of the operation is again requested.

Figure 18:
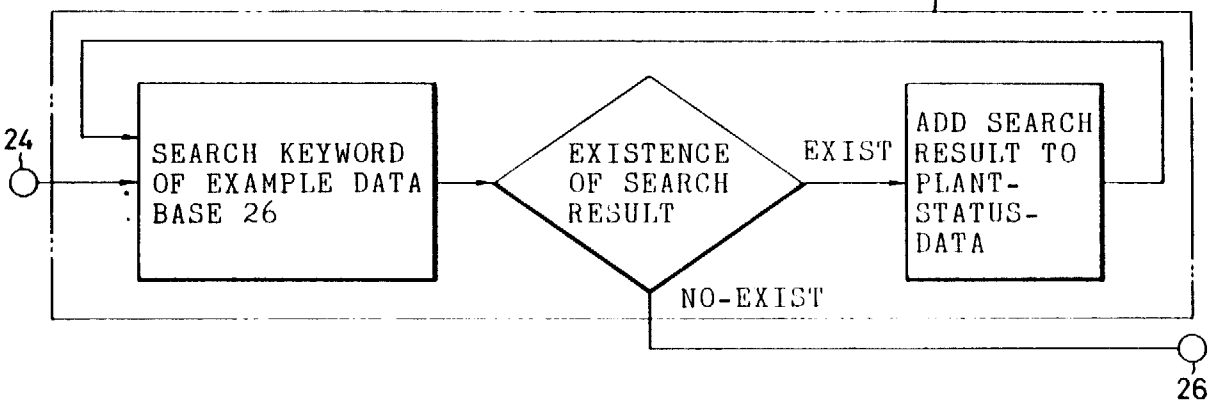
FIG. 18 is a block diagram of an analogous case retrieval division shown in FIG. 8.

The example searcher portion 43 shown in FIG. 18 is actuated from inputting the plant state signal 61. The example searcher portion 43 retrieves a case analogous to the plant state signal 61 from the example data base 26 which encloses practical cases as shown in FIG. 6. In this Embodiment, Case 1 representing "seizure of primary loop recirculation pump" shown in FIG. 6 is retrieved, and the contents are added to the plant state signal 61 to develop to a plant state signal 62, which is outputted from the example searcher portion 43.

Figure 19:
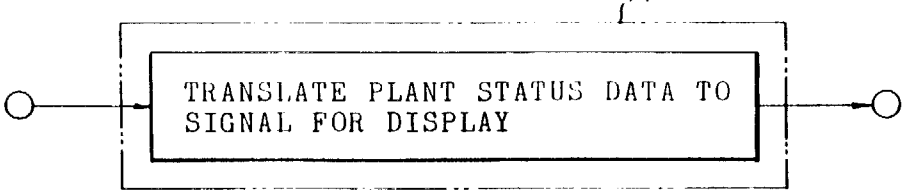
FIG. 19 is a block diagram of a guidance implementation division in FIG. 8.

The plant state signal 62 is inputted to the guidance implementation portion 44 shown in FIG. 19. The guidance implementation portion 44 outputs the plant state signal 60B shown in FIG. 27B through converting it into a CRT display output (into a character code for CRT, for example). In this case, the detail operating method and the contents of the analogous case are converted likewise. When converting the plant state signal 60B into the CRT display output, the guidance implementation portion 44 outputs that for CRT display which indicates the member state representing a cause and also the member state representing contents of the operation to cope therewith. For example, words (cause) and (operation contents) are added after the corresponding member states as: "seizure of primary loop recirculation pump (cause)" and "no operation carried out (operation contents)".

An output (plant state signal 60B) of the guidance implementation portion 44 is transferred to CRT 21 to display thereon. Observing the operation contents displayed on CRT 21, an operator of the boiling water reactor plant will operate an object equipment of the boiling water reactor plant on a control panel accordingly. The operation contents of this embodiment being "no operation carried out", a concrete operation will not be made for the boiling water reactor plant. To say reversely, an operation "no operation carried out" is performed for the boiling water reactor plant. From carrying out such operation, a void decreases, the reactor level 17 descends to the level L4, the bypass valve opens automatically, and thus the reactor pressure drops to a safe state in the boiling water reactor plant. In case, for example, contents of the plant state signal 60A are determined to be an optimal operation at the selector portion 41, the operator will operate the control panel 20 so as to trip a motor driven feed water pump according to the operation contents displayed on CRT 21. The command is given to feed water pumps 10A and 10B in operation from the control panel 20. Thus the feed water pumps 10A and 10B come to shutdown.

According to this embodiment, phenomena arising on the plant are all displayed on CRT when an actual operation is carried out based on the displayed operation contents, therefore a progress of the operation can be supervised by confirming the change of an actual state of the plant. Further, when "cause decision" and "operation determination" are made by utilizing the cause-consequence data base 22, a use of the predictor portion 34 may ensure a safe operation of the boiling water reactor plant (safety being ensured even from the motor driven feed water pump in trip) against an abnormal phenomenon which is not conceivable actually like "seizure of primary loop recirculation pump", thus obtaining an optimal operation high in safety.

When a guidance for such operating method as is high in safety against an abnormal phenomenon actually not conceivable for occurrence will have to be secured on an operation guide apparatus merely utilizing CCT and a technique of knowledge engineering (not including the predictor portion and the recursion controller portion unlike this embodiment), a large-scale data base must be provided, and labor will be required much for rules for the guidance implementation and maintenance. A materialization by the technique may involve difficulty, accordingly. Namely, a method to utilize CCT requires a vast amount of CCT to difficulty of implementation and maintenance. And in case the technique of knowledge engineering is utilized, the data runs vast inevitably in volume from the requirements that a data representing cause and consequence must be prepared to cover the case wherein the measured result to indicate the state of a plant is present plurally and that a data limited for the range of application must be prepared in consideration of forecasting a transition (or forecasting a change in dynamic process amount) of the plate beforehand since it cannot be forecasted.

According to a technique of this embodiment, operators are kept from troubles to improve the guidance operation, carry out such erroneous operation as will reduce an effect of the guidance operation, or take much time to cope with a load fluctuation when the plant is activated.

Then, a guidance coping at all times with a renewed situation can be provided to operators by rerunning the above processing through a generation of a new alarm, another request by the operator, or an interruption of an internal clock of the operation guide apparatus.

When the embodiment is put into practice, the plant data can be inputted at every member states at the point in time when the status recognition portion 31 is actuated, and the cause division of the cause-consequence data base 22 and the plant state signal are compared with each other.

When a plurality of plant states are obtained on the data transition portion 30, other technique to select such value as is not preferable for the plant than a majority decision can be used for logical decision to narrow down the states to one.

In the cause decision division 32, causes which are not contradictory each other will be outputted as a plural cause instead of concluding the cause to one only, and the ensuing processing can be done for each of them.

In the optimal operation determination division 38, the operation will not be determined to one only, those which meet the object of operation will be outputted accordingly, and the operator may have an option to select suitably from among them. Then, the processing can be cut to outputting at the point in time when those of meeting the object of operation are found more than the number set initially instead of obtaining an optimal operation.

The same one as the cause-consequence data base 22 will be used for the countermeasure data base 24, which can be identified by marking up properly for the contents.

The detail portion 42 and the example searcher portion 43 may be actuated upon indication of the operator. Then, a retrieval of analogous cases may be processed antecedently, or both may be processed concurrently, or either one only may be processed.

The predictor portion 34 can interpret an expression on the prediction data base 23 directly to execution, or it can operate for calculation by calling a subroutine for which information is stored on the prediction data base 23. Then, a table search can be done directly by the forecast feature or by a private subroutine with a similar technique.

For control of the cause decision division 32 and the optimal operation determination division 38, a similar processing can be implemented on a software by means of a stack instead of using a recursive call feature, or a function to realize the cause decision division 32 and the optimal operation determination division 38 is built on a hardware, which will be connected in series therefor by the number taken enough.

According to the embodiment given in FIG. 1, a large-scale data base is not required, which may facilitate implementation and maintenance. Then, since contents of the data base are independent at every units of configuration as shown in FIG. 2 to FIG. 6, in an extreme case, if any, where a phenomenon which is not included in the data base is produced, a trained operator will cope with such phenomenon by inputting the feature only to the data base, and thus a function of the operation guide apparatus can be amplified.

This invention can be applied to a pressurized water reactor plant, a fast breeder reactor plant and a thermal power plant, too.

According to this invention, a true cause of an abnormal state of the plant can be recognized.

What is claimed is:

1. A plant operating method comprising the steps of:

detecting plant data from a plant;

identifying the actual status of all members of the plant indicating an abnormality of the plant from the detected plant data;

estimating a cause of an occurrence of the abnormality in accordance with the actual status of the plant members;

predicting the status of all plant members after a given period of time has passed in accordance with the estimated cause;

determining whether or not the actual status of the plant members are present in the predicted status of the plant members;

repeatedly carrying out the step of estimating a cause of occurrence of the abnormality and predicting the status of all plant members in accordance therewith when it is determined that the actual status of all the plant members are not present in the predicted status of the plant members detected until the actual status of all the plant members come to exist in the predicted status of the plant members;

selecting a plant operation plan for overcoming the estimated cause of occurrence of the abnormality when the actual status of all of the plant members are present in the status of the predicted plant members; and operating the plant according to the selected operation plan.

2. The plant operating method according to claim 1, wherein the step of estimating the cause of occurrence of the abnormality is based upon data providing a cause and effect relationship.

3. The plant operating method as defined in claim 1, wherein the step of selecting an operation plan for overcoming the estimated cause of the abnormality includes predicting the status of the plant members when the selected operation is put into practice for a given period of time, determining whether or not the selected operation plan should be selected, and repeatedly carrying out selection of an operation plan to overcome an occurrence of the predicted status of the plant members in accordance with the selected operation plan until no operation plan is selected, and thereafter selecting an operating plan which satisfies operating conditions for the plant as the selected operation plan from among the operation plans thus obtained.

4. The plant operating method according to claim 3, wherein the step of selecting an operation plan includes retrieving data indicating the operation plan corresponding to the predicted status of the plant members.

5. The plant operating method according to claim 3, including the step of determining the status of the plant members arising as a consequence of the predicted status of the plant members.

6. The plant operating method according to claim 5, wherein the status of the plant members arising as a consequence of the predicted status of the plant members is obtained by retrieving data providing a cause and effect relationship.

7. The plant operating method according to claim 1 or 3, further comprising the steps of obtaining a detail procedure for the selected operating plan and determining whether the detail procedure is contrary to the limitations on the plant operation, and carrying out the selected operation plan when the detail procedure is not contrary to limitations on the plant operation, and selecting another operation plan for overcoming the estimated cause of the abnormality when the detail procedure is contrary to the limitations on the plant operation.

*8. An operating method comprising the steps of:*

(1) inputting data of a system to be operated;

(2) identifying the actual status of all members of the system indicating an abnormality of the system from the inputted data;

(3) estimating at least one cause of an occurrence of the abnormality in accordance with the actual status of the members;

(4) predicting the status of all members after a given period of time has passed in accordance with the estimated cause;

(5) determining whether or not the actual status of the members are present in the predicted status of the members;

(6) repeatedly carrying out the step of estimating at least one cause of occurrence of the abnormality and predicting the status of all members in accordance therewith when it is determined that the actual status of all members are not present in the predicted status of the members until the actual status of all members come to exist in the predicted status of the members;

(7) selecting an operation plan for overcoming the estimated cause of occurrence of the abnormality when the actual status of all of the members are present in the status of the predicted members; and (8) operating the system according to the selected operation plan.

*9. An operating method according to claim 8, wherein the step of estimating the cause of occurrence of the abnormality is based upon data providing a cause and consequence relationship.*

*10. An operating method according to claim 8, wherein the step of selecting an operation plan for overcoming the estimated cause of the abnormality includes the steps of:*

(1) predicting the status of the members when the selected operation is put into practice for a given period of time;

(2) determining whether or not the selected operation plan should be selected;

(3) repeatedly carrying out selection of an operation plan to overcome an occurrence of the predicted status of the members in accordance with the selected operation plan until no operation plan is selected; and thereafter (4) selecting an operation plan which satisfies operating conditions for the system as the selected operation plan from among the operation plans thus obtained.

*11. An operating method according to claim 10, wherein the step of selecting an operation plan includes the step of retrieving data indicating the operation plan corresponding to the predicted status of the members.*

*12. An operating method according to claim 10, further comprising the step of determining the status of the members arising as a consequence of the predicted status of the members.*

*13. An operating method according to claim 12, wherein the status of the members arising as a consequence of the predicted status of the members is obtained by retrieving data providing a cause and consequence relationship.*

*14. A method according to claim 8 or 10, further comprising the steps of:*

(1) obtaining a detail procedure for the selected operation plan;

(2) determining whether the detail procedure is contrary to the limitations on the operation;

(3) carrying out the selected operation plan when the detail procedure is not contrary to limitations on the operation; and (4) selecting another operation plan for overcoming the estimated cause of the abnormality when the detail procedure is contrary to the limitations on the operation.

*15. A method comprising the steps of:*

(1) inputting data of an object;

(2) identifying the actual status of all members of the object indicating an abnormality of the object from the inputted data;

(3) estimating at least one cause of an occurrence of the abnormality in accordance with the actual status of the members;

(4) predicting the status of all members after a given period of time has passed in accordance with the estimated cause;

(5) determining whether or not the actual status of the members are present in the predicted status of the members;

(6) repeatedly carrying out the step of estimating at least one cause of occurrence of the abnormality and predicting the status of all members in accordance therewith when it is determined that the actual status of all members are not present in the predicted status of the members detected until the actual status of all members come to exist in the predicted status of the members; and (7) selecting an operation plan for overcoming the estimated cause of occurrence of the abnormality when the actual status of all of the members are present in the status of the predicted members.

*16. A method according to claim 15, wherein the cause of occurrence of the abnormality is based upon data providing a cause and consequence relationship.*

*17. A method according to claim 15, wherein the step of selecting an operation plan for overcoming the estimated cause of the abnormality includes the steps of:*

(1) predicting the status of the members when the selected operation plan is put into practice for a given period of time, (2) determining whether or not the selected operation plan should be selected, (3) repeatedly carrying out selection of an operation plan to overcome an occurrence of the predicted status of the members in accordance with the selected operation plan until no operation plan is selected, and thereafter (4) selecting an operating plan which satisfies operating conditions for the object as the selected operation plan from among the operation plans thus obtained.

*18. A method according to claim 17, wherein the step of selecting an operation plan includes the step of retrieving data indicating the operation plan corresponding to the predicted status of the members.*

*19. A method according to claim 17, further comprising step of determining the status of the members arising as a consequence of the predicted status of the members.*

*20. A method according to claim 19, wherein the status of the members arising as a consequence of the predicted status of the members is obtained by retrieving data providing a cause and consequence relationship.*

*21. A method according to claim 15 or 17, further comprising the steps of:*

(1) obtaining a detail procedure for the selected operation plan;

(2) determining whether the detail procedure is contrary to the limitations on the operation; and (3) selecting another operation plan for overcoming the estimated cause of the abnormality when the detail procedure is contrary to the limitations on the operation.

*22. An apparatus including a computer comprising:*

(1) a memory for storing data bases including (a) a data base recording relations of causes and consequences, (b) a data base recording information to predict transitional behavior of an object, and (c) a data base recording operation plans; and (2) means for carrying out a processing program to make a guidance consultation to overcome a cause of abnormality of the object including (a) means for inputting data of the object, (b) means responsive to the inputting means for identifying the actual status of all members of the object indicating an abnormality of the object from the inputted data, (c) means responsive to the identifying means for estimating a cause of an occurrence of the abnormality in accordance with the actual status of the members, (d) means responsive to the estimating means for predicting the status of all members after a given period of time has passed in accordance with the estimated cause, (e) means responsive to the predicting means for determining whether or not the actual status of the members are present in the predicted status of the members, (f) means responsive to the determining means for repeatedly carrying out the estimating of a cause of occurrence of the abnormality and predicting the status of all members in accordance therewith when it is determined that the actual status of all members are not present in the predicted status of the members detected until the actual status of all members come to exist in the predicted status of the member, and (g) means responsive to the repeatedly carrying out means for selecting an operation plan for overcoming the estimated cause of occurrence of the abnormality when the actual status of all of the members are present in the status of the predicted members.

*23. An apparatus according to claim 22, wherein the means for estimating the cause of occurrence of the abnormality are based upon data providing a cause and consequence relationship.*

*24. An apparatus according to claim 22, wherein the means for selecting an operation plan for overcoming the estimated cause of the abnormality includes:*

(1) means for listing at least one operation plan;

(2) means responsive to the listing means for predicting the status of the members when a selected operation plan is put into practice for a given period of time;

(3) means responsive to the predicting means for determining whether or not the selected operation plan should be selected;

(4) means responsive to the determining means for repeatedly carrying out selection of another operation plan to overcome an occurrence of the predicted status of the members in accordance with the selected operation plan until no operation plan is selected; and thereafter (5) means responsive to the repeatedly carrying out means for selecting an operation plan which satisfies operating conditions for the object as the selected operation plan from among the operation plans thus obtained.

*25. An apparatus according to claim 24, wherein the means for selecting an operation plan further includes means for retrieving data indicating the operation plan corresponding to the predicted status of the members.*

*26. An apparatus according to claim 24, further comprising means for determining the status of the members arising as a consequence of the predicted status of the members.*

*27. An apparatus according to claim 26, wherein the status of the members arising as a consequence of the predicted status of the members is obtained by retrieving data providing a cause and consequence relationship.*

*28. An apparatus according to claim 22 or 24, further comprising:*

(1) means responsive to the selecting means for obtaining a detailed procedure for the selected operation plan;

(2) means responsive to the detail means for determining whether the detailed procedure is contrary to the limitations on the operation; and (3) means responsive to the determining means for selecting another operation plan for overcoming the estimated cause of the abnormality when the detailed procedure is contrary to the limitations on the operation.

*29. An apparatus including a computer comprising:*

(1) memory means for storing information forming a knowledge base including (a) data as facts expressed as at least one identifier portion indicative of a state of an object and a corresponding value portion, and (b) rules including IF parts and corresponding THEN parts, each of the IF parts and corresponding THEN parts including an identifier portion and a corresponding value; and (2) means for carrying out a processing program including interpretation of the knowledge base for guidance including (a) means for searching the knowledge base in accordance with a predetermined fact for comparing facts and rules so as to obtain at least one of an IF part or THEN part of a rule as a result of the comparison, (b) means responsive to the searching means for utilizing the comparison result as a new fact for searching of the knowledge base by the searching means, (c) means responsive to no comparison result from the searching means for terminating the search of the knowledge base, and (d) means responsive to termination of the search of the knowledge base by the terminating means for outputting a result of carrying out the processing program.

*30. An apparatus according to claim 29, wherein the means for carrying out a processing program further includes:*

(1) means for inputting data of the object;

(2) means responsive to the storing means for utilizing the actual status of all the members of the object indicating a state of the object as different facts, each having an identifier portion indicative of the state of the object and a corresponding value;

(3) means responsive to the utilizing means for searching the knowledge base to obtain an IF part of a rule in accordance with a predetermined fact when utilizing the predetermined fact as a THEN part of the rule;

(4) means responsive to the searching means for predicting the status of all members after a given period of time has passed in accordance with the IF part obtained as a new fact; and (5) means responsive to the predicting means for searching the knowledge base to determine whether or not the actual status of the members are present in the predicting status of the members.

*31. An apparatus according to claim 30, further comprising means for selecting an operation plan including:*

(1) means for listing at least one operation plan;

(2) means responsive to the listing means for predicting the status of the members when the selected operation plan is put into practice for a given period of time;

(3) means responsive to the predicting means for determining whether or not the selected operation plan should be selected;

(4) means responsive to the determining means for repeatedly carrying out selection of another operation plane in accordance with the selected operation plan until no operation plan is selected; and thereafter (5) means responsive to the repeatedly carrying out means for selecting an operation plan from among the operation plans thus obtained.

*32. An apparatus according to claim 31, wherein the means of selecting an operation plan includes means for retrieving data indicating the operation plan corresponding to the predicted status of the members.*

*33. An apparatus according to claim 31, further comprising:*

(1) means responsive to the selecting means for obtaining a detailed procedure for the selected operation plan;

(2) means responsive to the detail means for determining whether the detailed procedure is contrary to the limitations on the operation; and (3) means responsive to the determining means for selecting another operation plan when the detailed procedure is contrary to the limitations on the operation plan.

*34. An apparatus according to claim 31, further comprising means for determining the status of the members arising as a consequence of the predicted status of the members.*

*35. An apparatus according to claim 34, wherein the status of the status of the members arising as a consequence of the predicted status of the members is obtained by retrieving data providing a cause and consequence relationship.*

*36. A method comprising the steps of:*

(1) storing a data base forming a knowledge base including
  (a) data as facts expressed as at least one identifier portion indicative of the state of an object and a corresponding value portion, and
  (b) rules including IF parts and corresponding THEN parts, each of the IF parts and corresponding THEN parts including an identifier portion and a corresponding value; and
(2) carrying out a processing program including interpretation of the knowledge base for guidance including
  (a) searching the knowledge base in accordance with a predetermined fact for comparing facts and rules so as to obtain at least one of an IF part or THEN part of a rule as a result of the comparison,
  (b) utilizing the comparison result as a new fact for searching the knowledge base,
  (c) terminating the search of the knowledge base when no comparison result is obtained, and
  (d) outputting a result of carrying out the processing program in response to termination of the search of the knowledge base.

*37. A method according to claim 36, further comprising the steps of:*

(1) inputting data of the object,
(2) utilizing the actual status of all members of the object indicating a state of the object as different facts, each having an identifier portion indicative of the state of the object and a corresponding value,
(3) searching the knowledge base to obtain an IF part of a rule in accordance with a selected fact when utilizing the selected fact as a THEN part of a rule,
(4) predicting the status of all members after a given period of time has passed in accordance with the IF part obtained as a new fact, and
(5) searching the knowledge base to determine whether or not the actual status of the members are present in the predicted status of the members.

*38. A method according to claim 37, further comprising the step of selecting an operation plan including the steps of*

(1) predicting the status of the plant members when the selected operation plan is put into practice for a given period of time,
(2) determining whether or not the selected operation plan should be selected,
(3) repeatedly carrying out selection of an operation plan in accordance with the selected operation plan until no operation plan is selected, and thereafter
(4) selecting an operation plan from among the operation plans thus obtained.

*39. A method according to claim 38, wherein the step of selecting an operation plan includes the step of retrieving data indicating the operation plan corresponding to the predicted status of the members.*

*40. A method according to claim 38, further comprising the steps of:*

(1) obtaining a detail procedure for the selected operation plan,
(2) determining whether the detail procedure is contrary to the limitations on the operation, and
(3) selecting another operation plan when the detail procedure is contrary to the limitations on the operation.

*41. A method according to claim 38, further comprising the step of determining the status of the members arising as a consequence of the predicted status of the members.*

*42. A method according to claim 41, wherein the status of the members arising as a consequence of the predicted status of the members is obtained by retrieving data providing a cause and consequence relationship.*

*43. An apparatus including a computer comprising:*

(1) memory means for storing data forming a knowledge base including
  (a) data as facts expressed as at least one identifier portion indicative of a state of an object and a corresponding portion, and
  (b) rules including IF parts and corresponding THEN parts, each of the IF parts and corresponding THEN parts including an identifier portion and a corresponding value; and
(2) means for carrying out a processing program for interpretation of the knowledge base including
  (a) means for searching the knowledge baes in accordance with a selected fact for comparing facts and rules so as to obtain at least one of an IF part or THEN part of a rule as a result of the comparison,
  (b) means responsive to the comparison result of the searching means for terminating the search of the knowledge base, and
  (c) means responsive to the terminating means terminating the search of the knowledge base for outputting a result of carrying out the processing program.

*44. An apparatus according to claim 43, wherein the means for carrying out a processing program further includes*

(1) means for inputting data of the object,
(2) means for utilizing the actual status of all members of the object indicating an state of the object as different facts, each having an identifier portion indicative of the state of the object and a corresponding value, and
(3) means for searching the knowledge base to obtain an IF part of a rule in accordance with a selected fact when utilizing the selected fact as a THEN part of a rule.

*45. An apparatus according to claim 44, further comprising means for selecting an operation plan including*

(1) means for predicting the status of the members when the selected operation plan is put into practice for a given period of time,
(2) means for determining whether or not the selected operation plan should be selected,
(3) means for repeatedly carrying out selection of an operation plan in accordance with the selected operation plan until no operation plan is selected, and thereafter
(4) means for selecting an operation plan from among the operation plans thus obtained.

*46. An apparatus according to claim 45, wherein the means of selecting an operation plan includes means for retrieving data indicating the operation plan corresponding to the predicted status of the members.*

*47. An apparatus according to claim 45, further comprising:*

(1) means for obtaining a detail procedure for the selected operation plan, and (2) means for determining whether the detail procedure is contrary to the limitations on the operation, and means for selecting another operation plan when the detail procedure is contrary to the limitations on the operation.

*48. An apparatus according to claim 45, further comprising the means of determining the status of the members arising as a consequence of the predicted status of the members.*

*49. An apparatus according to claim 48, wherein the status of the members arising as a consequence of the predicted status of the members is obtained by retrieving data providing a cause and consequence relationship.*

*50. A method comprising the steps of:*

(1) storing a data base forming a knowledge base including (a) data as facts expressed as at least one identifier portion indicative of a state of an object and a corresponding value portion, and (b) rules including IF parts and corresponding THEN parts, each of the IF parts and corresponding THEN parts including an identifier portion and a corresponding value;

(2) carrying out a processing program including interpretation of the knowledge base including the steps of (a) searching the knowledge base in accordance with a selected fact for comparing facts and rules so as to obtain at least one of an IF part or THEN part of a rule as a result of the comparison, and (b) terminating the search of the knowledge base in response to the comparison result, and outputting a result of carrying out the processing program in response to termination of the search of the knowledge base.

*51. A method according to claim 50, further comprising the steps of:*

(1) inputting data of the object (2) utilizing the actual status of all members of the object, indicating a state of the object as different facts, each having an identifier portion indicative of the state of the object and a corresponding value, and (3) searching the knowledge base to obtain an IF part of a rule in accordance with a selected fact when utilizing the selected fact as a THEN part of a rule.

*52. A method according to claim 50, further comprising the step of selecting an operation plan including the steps of:*

(1) predicting the status of the plant members when the selected operation plan is put into practice for a given period of time, (2) determining whether or not the selected operation plan should be selected, (3) repeatedly carrying out selection of an operation plan in accordance with the selected operation plan until no operation plan is selected, and thereafter (4) selecting an operation plan from among the operation plans thus obtained.

*53. A method according to claim 52, wherein the step of selecting an operation plan includes the step of retrieving data indicating the operation plan corresponding to the predicted status of the members.*

*54. A method according to claim 52, further comprising the steps of:*

(1) obtaining a detail procedure for the selected operation plan, and (2) determining whether the detail procedure is contrary to the limitations on the operation, and (3) selecting another operation plan when the detail procedure is contrary to the limitations on the operation.

*55. A method according to claim 52, further comprising the step of determining the status of the members arising as a consequence of the predicted status of the members.*

*56. A method according to claim 55, wherein the status of the members arising as a consequence of the predicted status of the members is obtained by retrieving data providing a cause and consequence relationship.*

*57. A process comprising the steps of:*

(1) storing information forming a knowledge base in memory means of a computer including (a) data as facts expressed to be at least one identifier as a state of an object and corresponding values, (b) rules including IF parts and corresponding THEN parts with at least one value for an identifier;

(2) storing a processing program in memory means of the computer, the processing program enabling interpretation of the knowledge base by (a) searching the knowledge base for comparing facts and rules, (b) comparing facts with one of IF parts or THEN parts of the rules to obtain at least one of an IF part or THEN part as a result of the comparison, (c) adding new facts to the knowledge base as a result of the comparison, (d) terminating the search of the knowledge base, and outputting a result of carrying out the processing program; and (3) running the processing program for interpretation of the knowledge base.

*58. A process according to claim 51, further comprising the steps of:*

(1) inputting data of the object, (2) utilizing the actual status of all members of the object indicating a state of the object as different facts, each having an identifier portion indicative of the state of the object and a corresponding value, (3) searching the knowledge base to obtain an IF part of a rule in accordance with a selected fact when utilizing the selected fact as a THEN part of a rule, (4) predicting the status of all members after a given period of time has passed in accordance with the IF part obtained as a new fact, and (5) searching the knowledge base to determine whether or not the actual status of the members are present in the predicted status of the members.

*59. A process according to claim 58, further comprising the step of selecting an operation plan including the steps of:*

(1) predicting the status of the plant members when the selected operation plan is put into practice for a given period of time, (2) determining whether or not the selected operation plan should be selected, (3) repeatedly carrying out selection of an operation plant in accordance with the selected operation plan until no operation plan is selected, and thereafter (4) selecting an operation plan from among the operation plans thus obtained.

*60. A process according to claim 59, wherein the step of selecting an operation plan includes the step of retrieving data indicating the operation plan corresponding to the predicted status of the members.*

*61. A process according to claim 59, further comprising the steps of:*

(1) obtaining a detail procedure for the selected operation plan, and (2) determining whether the detail procedure is contrary to the limitations on the operation, and (3) selecting another operation plan when the detail procedure is contrary to the limitations on the operation.

*62. A process according to claim 59, further comprising the step of determining the status of the members arising as a consequence of the predicted status of the members.*

*63. A process according to claim 62, wherein the status of the members arising as a consequence of the predicted status of the members is obtained by retrieving data providing a cause and consequence relationship.*

*64. A process comprising the steps of:*

(1) storing information forming a knowledge base in memory means of a computer including (a) data as facts expressed to be at least one identifier as a state of an object and corresponding values, (b) rules including IF parts and corresponding THEN parts with at least one value for an identifier;

(2) storing a processing program in memory means of the computer, the processing program enabling interpretation of the knowledge base for guidance by (a) searching the knowledge base for comparing facts and rules, (b) comparing facts with one of IF parts or THEN parts of the rules to obtain at least one of an IF part or THEN part as a result of the comparison, and (c) terminating the search of the knowledge base, and outputting a result of carrying out the processing program; and (3) running the processing program for interpretation of the knowledge base for guidance.

*65. A process according to claim 64, further comprising the step of selecting an operation plan including the steps of:*

(1) predicting the status of the plant members when the selected operation plan is put into practice for a given period of time, (2) determining whether or not the selected operation plan should be selected, (3) repeatedly carrying out selection of an operation plan in accordance with the selected operation plan until no operation plan is selected, and thereafter (4) selecting an operation plan from among the operation plans thus obtained.

*66. A process according to claim 64, further comprising the steps of:*

(1) inputting data of the object, (2) utilizing the actual status of all members of the object indicating a state of the object as different facts, each having an identifier portion indicative of the state of the object and a corresponding value, and (3) searching the knowledge base to obtain an IF part of a rule in accordance with a selected fact when utilizing the selected fact as a THEN part of a rule.

*67. A process according to claim 66 or 65, further comprising the steps of:*

(1) obtaining a detail procedure for the selected operation plan, and (2) determining whether the detail procedure is contrary to the limitations on the operation, and (3) selecting another operation plan when the detail procedure is contrary to the limitations on the operation.

*68. A process according to claim 65, wherein the step of selecting an operation plan includes the step of retrieving data indicating the operation plan corresponding to the predicted status of the members.*

*69. A process according to claim 65, further comprising the step of determining the status of the members arising as a consequence of the predicted status of the members.*

*70. A process according to claim 69, wherein the status of the members arising as a consequence of the predicted status of the members is obtained by retrieving data providing a cause and consequence relationship.*

*71. A method comprising the steps of:*

(1) storing information including rules relating to status of a system in a memory of a computer, each of the rules having a cause portion and a corresponding consequence portion, (2) inputting data of the status of the system, (3) making interferences based upon the inputted data in accordance with rules stored in the memory, (4) predicting time-variant changes in the status of the system by utilizing the inputted data in accordance with the interferences made, and (5) terminating the making of interferences in accordance with the predicted changes of the status of the system.

* * * * *

US001033162B1

REEXAMINATION CERTIFICATE (2985th)

United States Patent [19]

[11] B1 Re. 33,162

Yoshida et al.

[45] Certificate Issued Sep. 10, 1996

[54] METHOD AND APPARATUS FOR GUIDANCE OF AN OPERATION OF OPERATING POWER PLANTS

[75] Inventors: Kenichi Yoshida, Hachioji; Takao Watanabe, Hitachi; Takashi Kiguchi, Mito, all of Japan

[73] Assignee: Hitachi, Ltd., Tokyo, Japan

Reexamination Request:
No. 90/003,187, Sep. 3, 1993

Reexamination Certificate for:

| | |
|---|---|
| Patent No.: | **Re. 33,162** |
| Issued: | **Feb. 13, 1990** |
| Appl. No.: | **141,304** |
| Filed: | **Jan. 6, 1988** |

Related U.S. Patent Documents

Reissue of:

| | |
|---|---|
| [64] Patent No.: | **4,563,746** |
| Issued: | **Jan. 7, 1986** |
| Appl. No.: | **433,908** |
| Filed: | **Oct. 12, 1982** |

[30] Foreign Application Priority Data

Oct. 14, 1981 [JP] Japan ..... 56-164632

[51] Int. Cl.[6] ..... G06F 15/18; G07B 13/02

[52] U.S. Cl. ..... 364/492; 364/551.01; 976/DIG. 296

[58] Field of Search ..... 364/492, 200, 364/900, 148, 184, 550, 551.01; 376/217, 216; 395/50, 52, 62, 66, 914, 915; 976/DIG. 296

[56] References Cited

U.S. PATENT DOCUMENTS

| | | | |
|---|---|---|---|
| 3,601,811 | 8/1971 | Yashino . | |
| 3,697,957 | 10/1972 | Barron . | |
| 3,873,817 | 3/1975 | Liang | 364/492 |
| 4,203,204 | 5/1980 | Murphy . | |
| 4,210,962 | 7/1980 | Marsh et al. . | |
| 4,286,330 | 8/1981 | Isaacson . | |
| 4,290,850 | 9/1981 | Omori et al. . | |
| 4,310,964 | 1/1982 | Murphy . | |
| 4,326,259 | 4/1982 | Cooper et al. . | |
| 4,368,509 | 1/1983 | Li . | |
| 4,450,530 | 5/1984 | Llinas et al. . | |
| 4,472,770 | 9/1984 | Li . | |
| 4,472,783 | 9/1984 | Johnstone et al. . | |
| 4,479,241 | 10/1984 | Buckley . | |

OTHER PUBLICATIONS

Winston, P.; "Artificial Intelligence"; Addison–Wesley (1979); pp. 129–156, 235–256 and 343–372.

Winston et al; "LISP"; Addison–Wesley (1981), pp. 239–250.

Sussman et al; "Constraints–A Language for Expressing Almost–Hierarchial Descriptions" Dec. 1980.

(List continued on next page.)

*Primary Examiner*—Ellis B. Ramirez

[57] ABSTRACT

This invention refers to a method and apparatus for guidance of an operation for overcoming an abnormal status of a plant. A plant data is detected from the plant, and all plant state members indicating an abnormality of the plant are identified from the plant data. The plant operating method and apparatus includes apparatus for estimating a cause whereby the plant status members are produced, predicting all plant status members arising after passing a given period of time according to the estimated cause, determining whether or not actual plant status members are present in the plant state members predicted and when the latter members are not present in the former members, repeatedly carrying out the processing of the steps of estimating and predicting to which the plant status members forcasted at the predicting step are inputted until all the actual plant status members come to exist in the plant status members forecasted at the predicting step. When all the actual plant status members are present in the plant status members predicted at the predicting step, a plant operation for overcoming the cause obtained at the step of estimating which produces the predicted plant status members is selected, and the plant operation is carried out according to the selected operation.

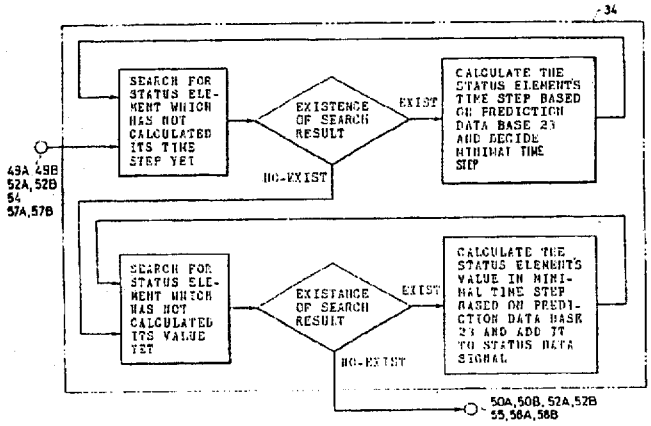

OTHER PUBLICATIONS

Fagan, L., et al., "VM: Representing Time-Dependent Relations in a Medical Setting", University Microfilms International, 1980.
Weiss, S., et al., "Expert: A System for Developing Consultation Models", pp. 942-947.
Buchanan, Bruce, et al., "Dendral and Meta-Dendral: Their Applications Dimension", Expert Systems and AI Applications, pp. 313-323.
Duda, R., et al., "Model Design in the Prospector Consultant System for Mineral Exploration", Expert Systems and AI Applications, pp. 334-349.
Aikins, J., "Prototypes and Production Rules: A Knowledge Representation for Computer Consultations", Stanford Heuristic Programming Project, Memo HPP-80-17, Aug. 1980.
Genesereth, M., et al, "MRS Manual", Stanford Heuristic programming Project Memo HPP-80-24, 1981.
Nii, H., et al., "AGE (Attempt to Generalize): A Knowledge-Based Program for Building Knowledge-Based Programs", Stanford Heuristic Programming Project, Memo HPP-79-4, Feb., 1979.
McDermott, J., "R1: A Rule-Based Configurer of Computer Systems", Apr., 1980.
Anderson, R., et al., "Rand Intelligent Terminal Agent (RITA): Design Philosophy", Defense Advanced Research Projects Agency, Feb., 1976.
Bennett, J., et al., "Sacon: A Knowledge-Based Consultant for Structural Analysis", Stanford University, Heuristic Programming Project, Memo HPP-78-23, 1978.
Van Melle, W., et al., "The Emycin Manual", Stanford University, Heuristic Programming Project, Memo HPP-81-16, Oct., 1981.
"Computer & Control Abstracts", vol. 14, No. 163, Dec. 1979, pp. 1973-1974.
Yu, V., et al., "Antimicrobial Selection by a Computer", JAMA, Sep. 21, 1979, vol. 242, No. 12, pp. 1279-1282.
Clark, K., et al., "Prolog: A Language for Implementing Expert Systems", Imperial College, Department of Computing, Nov., 1980.
Clocksin, W., et al., "Programming in Prolog", Springer-Verlag, Berlin Heidelberg, New York, 1981.
Clancey, W., et al., "Intelligent Computer-Aided Instruction for Medical Diagnosis", IEEE, 1979, pp. 175-183.
Donert, J., et al., "Translation of SA 80, A Program Package For Digital Controls", Datenverarbeitung Aegtelefunken 7 (1975) 2/3.
Manna, Z., et al., "Deductive Synthesis of the Unification Algorithm", Stanford University, Jun. 1981.
Scott, A., et al., "Explanation Capabilities of Production--Based Consultation Systems", Stanford University Heuristic Programming Project, Memo HPP-77-1, Feb., 1977.
Hammond, P., "Logic Programming for Expert Systems", Technical Report DOC 82/4, Mar., 1982.
Bobrow, D., et al., "An Overview of KRL, a Knowledge Representation Language", Structured Object Representations, pp. 263-285.
L. Fagan et al. "Representation of Dynamic Clinical Knowledge: Measurement Interpretation in the Intensive Care Unit", Proceedings of the Sixth International Joint Conference on Artificial Intelligence, vol. 1, pp. 260-262 (Aug. 20-23, 1979).
Shortliffe et al., "Oncocin: An Expert System for Oncology Protocol Management", Proceedings of Seventh International Joint Conference on Artificial Intelligence, (Aug. 24-28, 1981).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–28 is confirmed.

Claims 29–30, 36–37, 43, 45, 50, 52, 57–58, 64–66 and 71 are determined to be patentable as amended.

Claims 31–35, 38–42, 44, 46–49, 51, 53–56, 59–63 and 67–70, dependent on an amended claim, are determined to be patentable.

New claims 72–95 are added and determined to be patentable.

29. An apparatus including a computer comprising:

(1) memory means for storing information forming a knowledge base, *said knowledge base* including:

(a) data [as] *made up of* facts, [expressed as]*each fact having* at least one identifier portion indicative of a state of an object and a corresponding value portion, *said data also including information concerning at least one fact which permits the change of its value portion with time to be determined;* and (b) rules including IF parts and corresponding THEN parts, each of the IF parts and corresponding THEN parts including an identifier portion and a corresponding value *portion*; and (2) means for [carrying out] *executing* a processing program [including interpretation of] *to interpret* the knowledge base for guidance, *said means for executing* including:

(a) means for searching the knowledge base in accordance with a predetermined fact [for], *said means for searching* comparing facts and rules [so as to obtain] *and obtaining* at least one of an IF part or THEN part of a rule as a result of the comparison[,];

(b) means [responsive to the searching means] for utilizing the comparison result *of said means for searching* as a new fact for searching of the knowledge base *further* by [the searching] *said* means[,] *for searching in response to the comparison result of said means for searching;*

(c) *means for predicting the status of members of the object after a given period of time has passed in accordance with the comparison result of said means for searching;*

[(c)] (*d*) means [responsive to no comparison result from the searching means] for terminating the search of the knowledge base[,] *when no comparison result is obtained from said means for searching;* and

[(d)] (*e*) means [responsive to termination of the search of the knowledge base by the terminating means] for outputting a result of [carrying out] the processing program *execution when the search of the knowledge base is terminated by said means for terminating.*

30. [An apparatus according to claim 29, wherein the means for carrying out a processing program further includes:] *An apparatus including a computer comprising:*

(*1*) *memory means for storing information forming a knowledge base, said knowledge base including:*

(*a*) *data made up of facts, each fact having at least one identifier portion indicative of a state of an object and a corresponding value portion, said data also including information concerning at least one fact which permits the change of its value portion with time to be determined; and*

(*b*) *rules including IF parts and corresponding THEN parts, each of the IF parts and corresponding THEN parts including an identifier portion and a corresponding value portion; and*

(*2*) *means for executing a processing program to interpret the knowledge base for guidance, said means for executing including:*

(*a*) *means for searching the knowledge base in accordance with a predetermined fact, said means for searching comparing facts and rules and obtaining at least one of an IF part or THEN part of a rule as a result of the comparison;*

(*b*) *means for utilizing the comparison result of said means for searching as a new fact for searching of the knowledge base further by said means for searching in response to the comparison result of said means for searching;*

(*c*) *means for terminating the search of the knowledge base when no comparison result is obtained from said means for searching;*

(*d*) *means for outputting a result of the processing program execution when the search of the knowledge base is terminated by said means for terminating;*

[(1)] (*e*) means for inputting data of the object;

[(2)] (*f*) means responsive to the storing means for utilizing the actual status of all the members of the object indicating a state of the object as different facts, each having an identifier portion indicative of the state of the object and a corresponding value;

[(3)] (*g*) means responsive to the utilizing means for searching the knowledge base to obtain an IF part of a rule in accordance with a predetermined fact when utilizing the predetermined fact as a THEN part of the rule;

[(4)] (*h*) means responsive to the searching means for predicting the status of all members after a given period of time has passed in accordance with the IF part obtained as a new fact; and

[(5)] (*i*) means responsive to the predicting means for searching the knowledge base to determine whether or not the actual status of the members are present in the predicting status of the members.

36. A method comprising the steps of:

(1) storing a data base [forming] *to form a knowledge* base including:

(a) data [as] *made up of* facts [expressed as], *each fact having* at least one identifier portion indicative of the state of an object and a corresponding value portion, *said data also including information concerning at least one fact which permits the change of its value portion with time to be determined;* and (b) rules including IF parts and corresponding THEN parts, each of the IF parts and corresponding THEN parts including an identifier portion and a corresponding value *portion*; and (2) [carrying out] *executing* a processing program to [including interpretation of] *interpret* the knowledge base for guidance, *said processing program* including *the sub-steps of:*

(a) searching the knowledge base [in accordance with] *for* a predetermined fact [for] *by* comparing facts and rules [so as] to obtain at least one of an IF part or THEN part of a rule as a result of the comparison[,];

(b) utilizing the comparison result as a new fact for *further* searching *of* the knowledge base[,];

*(c) predicting the status of members of the object after a given period of time has passed in accordance with the comparison result of said means for searching;*

[(c)] *(d)* terminating the search of the knowledge base when no comparison result is obtained[,]; and

[(d)] *(e)* outputting a result of [carrying out] the processing program *execution* in response to *the* termination of the search of the knowledge base.

37. [A method according to claim 36, further comprising the steps of:] *A method comprising the steps of:*

*(1) storing a data base to form a knowledge base including:*

*(a) data made up of facts, each fact having at least one identifier portion indicative of the state of an object and a corresponding value portion, said data also including information concerning at least one fact which permits the change of its value portion with time to be determined; and*

*(b) rules including IF parts and corresponding THEN parts, each of the IF parts and corresponding THEN parts including an identifier portion and a corresponding value portion; and*

*(2) executing a processing program to interpret the knowledge base for guidance, said processing program including the sub-steps of:*

*(a) searching the knowledge base for a predetermined fact by comparing facts and rules to obtain at least one of an IF part or THEN part of a rule as a result of the comparison;*

*(b) utilizing the comparison result as a new fact for further searching of the knowledge base;*

*(c) terminating the search of the knowledge base when no comparison result is obtained;*

*(d) outputting a result of the processing program execution in response to the termination of the search of the knowledge base;*

[(1)] *(e)* inputting data of the object[,];

[(2)] *(f)* utilizing the actual status of all members of the object indicating a state of the object as different facts, each having an identifier portion indicative of the state of the object and a corresponding value[,];

[(3)] *(g)* searching the knowledge base to obtain an IF part of a rule in accordance with a selected fact when utilizing the selected fact as a THEN part of a rule[,];

[(4)] *(h)* predicting the status of all members after a given period of time has passed in accordance with the IF part obtained as a new fact[,]; and

[(5)] *(i)* searching the knowledge base to determine whether or not the actual status of the members are present in the predicted status of the members.

43. An apparatus including a computer comprising:

(1) memory means for storing data forming a knowledge base, *said knowledge base* including:

(a) data [as] *made up of* facts, [expressed as]*each fact having* at least one identifier portion indicative of a state of an object and a corresponding portion, *said data also including information concerning at least one fact which permits the change of its value portion with time to be determined;* and (b) rules including IF parts and corresponding THEN parts, each of the IF parts and corresponding THEN parts including an identifier portion and a corresponding value *portion*; and (2) means for [carrying out] *executing* a processing program [for interpretation of] *to interpret* the knowledge *base* including:

(a) means for searching the knowledge [baes] base in accordance with a selected fact, *said means* for *searching* comparing facts and rules [so as] to obtain at least one of an IF part or THEN part of a rule as a result of the comparison[,];

*(b) means for predicting the status of members of the object after a given period of time has passed in accordance with the comparison result of said means for searching;*

[(b)] *(c)* means [responsive to the comparison result of the searching means] for terminating the search of the knowledge base[,] *in response to the comparison result of said means for searching;* and

[(c)] *(d)* means [responsive to the terminating means terminating the search of the knowledge base] for outputting a result of [carrying out] the processing program *execution when the search of the knowledge base is terminated by said means for terminating.*

45. [An apparatus according to claim 44, further comprising] *An apparatus including a computer comprising:*

*(1) memory means for storing data forming a knowledge base, said knowledge base including:*

*(a) data made up of facts, each fact having at least one identifier portion indicative of a state of an object and a corresponding portion, said data also including information concerning at least one fact which permits the change of its value portion with time to be determined; and*

*(b) rules including IF parts and corresponding THEN parts, each of the IF parts and corresponding THEN parts including an identifier portion and a corresponding value portion; and*

*(2) means for executing a processing program to interpret the knowledge base including:*

*(a) means for searching the knowledge base in accordance with a selected fact, said means for searching comparing facts and rules to obtain at least one of an IF part or THEN part of a rule as a result of the comparison;*

*(b) means for terminating the search of the knowledge base in response to the comparison result of said means for searching;*

*(c) means for outputting a result of the processing program execution when the search of the knowledge base is terminated by said means for terminating;*

*(d) means for inputting data of the object,*

*(e) means for utilizing the actual status of all members of the object indicating an state of the object as different facts, each having an identifier portion indicative of the state of the object and a corresponding value, and*

*(f) means for searching the knowledge base to obtain an IF part of a rule in accordance with a selected fact when utilizing the selected fact as a THEN part of a rule;*

*(3)* means for selecting an operation plan including

[(1)] *(a)* means for predicting the status of the members when the selected operation plan is put into practice for a given period of time[,];

[(2)] (*b*) means for determining whether or not the selected operation plan should be selected[,];

[(3)] (*c*) means for repeatedly carrying out selection of an operation plan in accordance with the selected operation plan until no operation plan is selected[,]; and [thereafter]

[(4)] (*d*) means for selecting an operation plan from among the operation plans thus obtained.

50. A method comprising the steps of:

(1) storing a data base [forming] *to form* a knowledge base, *the knowledge base* including:

(a) data [as] *made up of* facts [expressed as], *each fact having* at least one identifier portion indicative of a state of an object and a corresponding value portion, *said data also including information concerning at least one fact which permits the change of its value portion with time to be determined;* and (b) rules including IF parts and corresponding THEN parts, each of the IF parts and corresponding THEN parts including an identifier portion and a corresponding value *portion; and*

(2) [carrying out] *executing* a processing program [including interpretation of] *which interprets* the knowledge base including the *sub-steps* [steps of]:

(a) searching the knowledge base [in accordance with] *for* a selected fact [for] *by* comparing facts and rules so as to obtain at least one of an IF part or THEN part of a rule as a result of the comparison[, and];

(*b*) *predicting the status of members of the object after a given period of time has passed in accordance with the comparison result of said means for searching;*

[(b)] (*c*) terminating the search of the knowledge base in response to the comparison result[,]; and (*d*) outputting a result of [carrying out] the processing program *execution* in response to *the* termination of the search of the knowledge base.

52. [A method according to claim 50, further comprising the step of] *A method comprising the steps of:*

(*1*) *storing a data base to form a knowledge base, the knowledge base including:*

(*a*) *data made up of facts, each fact having at least one identifier portion indicative of a state of an object and a corresponding value portion, said data also including information concerning at least one fact which permits the change of its value portion with time to be determined; and*

(*b*) *rules including IF parts and corresponding THEN parts, each of the IF parts and corresponding THEN parts including an identifier portion and a corresponding value portion; and*

(2) *executing a processing program which interprets the knowledge base including the sub-steps of:*

(*a*) *searching the knowledge base for a selected fact by comparing facts and rules so as to obtain at least one of an IF part or THEN part of a rule as a result of the comparison;*

(*b*) *terminating the search of the knowledge base in response to the comparison result;*

(*c*) *outputting a result of the processing program execution in response to the termination of the search of the knowledge base;*

(*d*) *inputting data of the object;*

(*e*) *utilizing the actual status of all members of the object, indicating a state of the object as different facts, each having an identifier portion indicative of the state of the object and a corresponding value; and*

(*f*) *searching the knowledge base to obtain an IF part of a rule in accordance with a selected fact when utilizing the selected fact as a THEN part of a rule; and*

(3) selecting an operation plan including the steps of:

[(1)] (*a*) predicting the status of the plant members, when the selected operation plan is put into practice for a given period of time[,];

[(2)] (*b*) determining whether or not the selected operation plan should be selected[,];

[(3)] (*c*) repeatedly carrying out selection of an operation plan in accordance with the selected operation plan until no operation plan is selected[,]; and thereafter

[(4)] (*d*) selecting an operation plan from among the operation plans thus obtained.

57. A process comprising the steps of:

(1) storing information forming a knowledge base in *a* memory [means] of a computer including:

(a) data [as] *made up of* facts [expressed to be], *each fact having* at least one identifier as a state of an object and corresponding values[,]; *and*

(b) rules including IF parts and corresponding THEN parts with at least one value for an identifier;

(2) storing a processing program in *the* memory [means] of the computer, the processing program [enabling interpretation of] *adapted to interpret* the knowledge base by *the sub-steps of:*

(a) searching the knowledge base *in a predetermined sequence, the steps in said predetermined sequence including at least* [for comparing facts and rules, (b)] comparing *a* [facts] *fact* with [one of] *an* IF [parts or THEN parts] *part* of [the] *a* [rules] *rule* to obtain [at least one of an IF part or] *a corresponding* THEN part as a result of the comparison, *and comparing a fact with a THEN part of a rule to obtain the corresponding IF part as a result of the comparison;*

[(c)] (*b*) adding new facts to the knowledge base as a result of the [comparison,]*comparisons;*

(*c*) *predicting the status of members of the object after a given period of time has passed in accordance with the comparison result of said means for searching;*

(d) terminating the search of the knowledge base[,]; and (e) outputting a result of the processing program *execution*; and (3) [running] *executing* the processing program [for interpretation of] *to interpret* the knowledge base.

58. [A process according to claim 51, further comprising the steps of:] *A process comprising the steps of:*

(*1*) *storing information forming a knowledge base in a memory of a computer including:*

(*a*) *data made up of facts, each fact having at least one identifier as a state of an object and corresponding values; and*

(*b*) *rules including IF parts and corresponding THEN parts with at least one value for an identifier;*

(2) *storing a processing program in the memory of the computer, the processing program adapted to interpret the knowledge base by the sub-steps of:*

(*a*) *searching the knowledge base in a predetermined sequence, the steps in said predetermined sequence including at least comparing a fact with an IF part of a rule to obtain a corresponding THEN part as a result of the comparison, and comparing a fact with a THEN part of a rule to obtain the corresponding IF part as a result of the comparison;*

(*b*) *adding new facts to the knowledge base as a result of the comparisons;*

(*c*) *terminating the search of the knowledge base; and*

(*d*) *outputting a result of the processing program execution;*

[(1)] (*e*) inputting data of the object[,];

[(2)] (*f*) utilizing the actual status of all members of the object indicating a state of the object as different facts, each having an identifier portion indicative of the state of the object and a corresponding value[,];

[(3)] (*g*) searching the knowledge base to obtain an IF part of a rule in accordance with a selected fact when utilizing the selected fact as a THEN part of a rule[,];

[(4)] (*h*) predicting the status of all members after a given period of time has passed in accordance with the IF part obtained as a new fact[,]; and

[(5)] (*i*) searching the knowledge base to determine whether or not the actual status of the members are present in the predicted status of the members[,]; *and*

(*3*) *executing the processing program to interpret the knowledge base.*

64. A process comprising the steps of:

(1) storing information forming a knowledge base in memory means of a computer including:

(a) data [as] *made up of* facts, [expressed to be] *each fact having* at least one identifier as a state of an object and corresponding values[,]; *and*

(b) rules including IF parts and corresponding THEN parts [with], *each of said IF parts and THEN parts including* at least one value for an identifier;

(2) storing a processing program in memory means of the computer, the processing program [enabling interpretation of] *adapted to interpret* the knowledge base for guidance by *the sub-steps of:*

(a) searching the knowledge base [for] *by* comparing facts with one of *the* IF parts or THEN parts of the rules;

(*c*) [to obtain] *obtaining* at least one of an IF part or THEN part as a result of the comparison[, and] *when a match is found;*

(*d*) predicting the status of members of the object after a given period of time has passed in accordance with the comparison result of said means for searching;

[(c)] (*e*) terminating the search of the knowledge base [, and] *before all possible comparisons have been made; and*

(*f*) outputting a result of [carrying out] the processing program *execution*; and (3) [running] *executing* the processing program for interpretation of the knowledge base for guidance.

65. [A process according to claim 64, further comprising the step of selecting an operation plan including the steps of:] *A process comprising the steps of:*

(*1*) *storing information forming a knowledge base in memory means of a computer including:*

(*a*) *data made up of facts, each fact having at least one identifier as a state of an object and corresponding values; and*

(*b*) *rules including IF parts and corresponding THEN parts, each of said IF parts and THEN parts including at least one value for an identifier;*

(2) *storing a processing program in memory means of the computer, the processing program adapted to interpret the knowledge base for guidance by the sub-steps of:*

(*a*) *searching the knowledge base by comparing facts +g with one of the IF parts or THEN parts of the rules;*

(*b*) *obtaining at least one of an IF part or THEN part as a result of the comparison when a match is found;*

(*c*) *terminating the search of the knowledge base before all possible comparisons have been made; and*

(*d*) *outputting a result of the processing program execution;*

(*3*) *executing the processing program for interpretation of the knowledge base for guidance; and*

(4) selecting an operation plan including the steps of:

[(1)] (a) predicting the status of the plant members when the selected operation plan is put into practice for a given period of time,

[(2)] (*b*) determining whether or not the selected operation plan should be selected,

[(3)] (*c*) repeatedly carrying our selection of an operation plan in accordance with the selected operation plan until no operation plan is selected, and thereafter

[(4)] (*d*) selecting an operation plan from among the operation plans thus obtained.

66. A process according to claim [64] *65*, further comprising the steps of:

(1) inputting data of the object, (2) utilizing the actual status of all members of the object indicating a state of the object as different facts, each having an identifier portion indicative of the state of the object and a corresponding value, and (3) searching the knowledge base to obtain an IF part of a rule in accordance with a selected fact when utilizing the selected fact as a THEN part of a rule.

71. A method comprising the steps of:

(1) storing information including rules relating to status of a system in a memory of a computer, each of the rules having a cause portion and a corresponding consequence portion, (2) inputting data of the status of the system, (3) making [interferences] *inferences* based upon the inputted data in accordance with rules stored in the memory, (4) predicting [time-varient] changes in the status of *members of* the system by utilizing the inputted data in accordance with the [interferences] *inferences* made, and (5) terminating the making of [interferences] *inferences* in accordance with the predicted changes of the status of the system.

*72. An apparatus including a computer comprising:*

(*1*) *memory means for storing data to form a knowledge base, said knowledge base including:*

(*a*) *data made up of facts, each fact having at least one identifier portion indicative of a state of an object and a corresponding value portion; and*

(*b*) *rules including IF parts and corresponding THEN parts, each of the IF parts and corresponding THEN parts including an identifier portion and a corresponding value portion; and*

(2) *means for executing a processing program to interpret the knowledge base including:*

(*a*) *means for searching the knowledge base in accordance with a selected fact and in a predetermined sequence in which said fact is compared with one of an IF and a THEN part to obtain the corresponding THEN part or IF part, respectively, as a result of the comparison and then comparing a fact with the other of an IF or THEN part of the rules to obtain the*

*corresponding THEN part or IF part, respectively, as a result of the comparison;*

*(b) means for predicting the status of members of the object after a given period of time has passed in accordance with the comparison result of said means for searching;*

*(c) means for terminating the search of the knowledge base in response to the comparison results of said means for searching and*

*(d) means for outputting a result of the processing program execution when the search of the knowledge base is terminated by said means for terminating.*

*73. A method comprising the steps of:*

*(1) storing a data base forming a knowledge base, said knowledge base including:*

*(a) means for searching the knowledge base, in accordance with a selected fact and in a predetermined sequence in which said fact is compared with one of an IF and a THEN part to obtain the corresponding THEN part or IF as a result of the comparison and then comparing a fact with the other of an IF or THEN part of the rules to obtain the corresponding THEN part or IF part as a result of the comparison;*

*(b) rules including IF parts and corresponding THEN parts, each of said IF parts and THEN parts including an identifier portion and a corresponding value portion; and*

*(2) executing a processing program to interpret the knowledge base including the sub-steps of:*

*(a) searching the knowledge base in accordance with a selected fact and in a predetermined sequence in which said fact is compared with one of an IF and a THEN part to obtain the corresponding THEN part or IF part, respectively, as a result of the comparison and then comparing a fact with the other of an IF or THEN part of the rules to obtain the corresponding THEN part or IF part, respectively, as a result of the comparison;*

*(b) predicting the status of members of the object after a given period of time has passed in accordance with the comparison result of said means for searching;*

*(c) obtaining a corresponding THEN part and IF part, respectively, as a result of the comparison;*

*(d) terminating the search of the knowledge base in response to the comparison result; and*

*(e) outputting a result of the processing program execution in response to termination of the search of the knowledge base.*

*74. An apparatus including a computer comprising:*

*(1) memory means for storing data forming a knowledge base, said knowledge base including:*

*(a) data made up of facts, each fact having at least one identifier portion indicative of a state of an object and a corresponding value portion; and*

*(b) rules including IF parts and corresponding THEN parts, each of the IF parts and corresponding THEN parts including an identifier portion and a corresponding value portion; and*

*(2) means for executing a processing program to interpret the knowledge base including:*

*(a) means for searching the knowledge base in accordance with a selected fact by comparing facts and rules;*

*(b) means for obtaining at least one of an IF part or THEN part of a rule as a result of the comparison;*

*(c) means for predicting the status of members of the object after a given period of time has passed in accordance with the comparison result of said means for searching;*

*(d) means for terminating the search of the knowledge base in response to a comparison result before all possible comparisons are made; and*

*(e) means for outputting a result of the processing program execution in response to the termination by said means for terminating the search of knowledge base.*

*75. A method comprising the steps of:*

*(1) storing a data base forming a knowledge base, said knowledge base including:*

*(a) data made up of facts, each fact having at least one identifier portion indicative of a state of an object and a corresponding value portion; and*

*(b) rules including IF parts and corresponding THEN parts including an identifier portion and a corresponding value portion;*

*(2) executing a process program which interprets the knowledge base including the sub-steps of:*

*(a) searching the knowledge base in accordance with a selected fact by comparing facts and rules;*

*(b) obtaining at least one of an IF part or THEN part of a rule as a result of the comparison;*

*(c) predicting the status of members of the object after a given period of time has passed in accordance with the comparison result of said means for searching:*

*(d) terminating the search of the knowledge base before all possible comparisons are made; and*

*(e) outputting a result of the processing program execution in response to the termination of the search of the knowledge base.*

*76. An apparatus including a computer comprising:*

*(1) memory means for storing data forming a knowledge base including*

*(a) data made up of facts, each fact having at least one identifier portion indicative of a state of an object and a corresponding value portion; and*

*(b) rules including IF parts and corresponding THEN parts, each of the IF parts and corresponding THEN parts including an identifier portion and a corresponding value portion; and*

*(2) means for executing a processing program to interpret the knowledge base including:*

*(a) means for carrying out a portion of said program including searching the knowledge base in accordance with a selected fact by comparing facts and rules, obtaining at least one of an IF part or THEN part of a rule as a result of the comparison, and repeating said portion of the processing program;*

*(b) means for predicting the status of members of the object after a given period of time has passed in accordance with the comparison result of said means for searching;*

*(c) means for terminating the repetition of said portion of the processing program in response to a comparison result of the search; and*

*(d) means for outputting a result of the processing program execution in response to the termination of the search of the knowledge base by said means for terminating.*

*77. A method comprising the steps of:*

*(1) storing a data base forming a knowledge base, said knowledge base including:*

*(a) data made up of facts, each fact having at least one identifier portion indicative of a state of an object and a corresponding value portion; and*

(b) rules including IF parts and corresponding THEN parts including an identifier portion and a corresponding value portion; and (2) carrying out a processing program to interpret the knowledge base including the sub-steps of:

(a) carrying out a portion of said program including searching the knowledge base in accordance with a selected fact for comparing facts and rules so as to obtain at least one of an IF part or THEN part of a rule as a result of the comparison result;

(b) repeating said portion of the processing program;

(c) predicting the status of members of the object after a given period of time has passed in accordance with the comparison result of said means for searching;

(d) terminating the repetition of said portion of the processing program in response to a comparison result of the search; and (e) outputting a result of the processing program execution in response to the termination of the search of the knowledge base.

78. Apparatus including a computer comprising:

(1) memory means for storing data forming a knowledge base including:

(a) data made up of facts, each fact having at least one identifier portion indicative of a state of an object and a corresponding value portion; and (b) rules including IF parts and corresponding THEN parts, each of the IF parts and corresponding THEN parts including an identifier portion and a corresponding value portion;

(2) means for executing a processing program for interpretation of the knowledge base including:

(a) means for searching the knowledge base in accordance with a selected fact for comparing facts and rules so as to obtain at least one of an IF part or THEN part of a rule as a result of the comparison;

(b) means for predicting the status of members of the object after a given period of time has passed in accordance with the comparison result of said means for searching;

(c) means for terminating the search of the knowledge base in response to the comparison result of the searching means; and (d) means for outputting a result of the processing program execution in response to the termination of the search of the knowledge base by said means for terminating; and (3) means for initiating an operation based on said result output.

79. An apparatus for evaluating a system comprising computer including:

(1) memory means for storing:

(a) a knowledge base including:

(i) data made up of facts, each fact having at least one identifier portion indicative of a state of an object and a corresponding value portion, and (ii) rules including IF parts and corresponding THEN parts, each of the IF parts and corresponding THEN parts including an identifier portion and a corresponding value portion; and (b) a processing program adapted to interpret the knowledge base, said processing program including (i) means for searching the knowledge base in accordance with a selected fact, said means for searching comparing facts and rules to obtain at least one of an IF part or THEN part of a rule as a result of the comparison;

(ii) means for predicting the status of members of the object after a given period of time has passed in accordance with the comparison result of said means for searching;

(iii) means for terminating the search of the knowledge base in response to the comparison result of said means for searching; and (iv) means for outputting a result of the processing program execution when the search of the knowledge base is terminated by said means for terminating;

(2) means for inputting system state data from the system to the knowledge base;

(3) means for translating said system state data into a form usable by said processing program and adding it as facts to said knowledge base; and (4) means for carrying out said processing program.

80. The process of claim 57 wherein said sub-step of searching first compares said fact with an IF part of a rule to obtain a corresponding THEN part and subsequently compares a fact with a THEN part of a rule to obtain a corresponding IF part.

81. The process of claim 80 wherein the fact compared with said THEN part is a second fact obtained when said fact is compared with said IF part.

82. The apparatus of claim 72 wherein said means for searching first compares a first fact with an IF part of a rule to obtain a corresponding THEN part and subsequently compares a fact with a THEN part of a rule to obtain a corresponding IF part.

83. The apparatus of claim 82 wherein said fact compared with said THEN part is a second fact obtained when said first fact is compare with said IF part.

84. The method of claim 73 wherein said sub-step of searching first compares a first fact with an IF part of a rule to obtain a corresponding THEN part and subsequently compares a fact with a THEN part of a rule to obtain a corresponding IF part.

85. The process of claim 84 wherein said fact compared with said THEN part is a second fact obtained when said first fact is compared with said IF part.

86. The apparatus of claim 43 wherein said means for searching the knowledge base does so in accordance with a selected fact and in a predetermined sequence in which said fact is compared with one of an IF part and a THEN part to obtain the corresponding THEN part or IF part, respectively, and then comparing a fact with the other of an IF part or THEN part of the rules to obtain the corresponding THEN part or IF part, respectively, as a result of the comparison.

87. The apparatus of claim 86 wherein said means for searching first compares a first fact with an IF part of a rule to obtain a corresponding THEN part and subsequently compares a fact with a THEN part of a rule to obtain a corresponding IF part.

88. The apparatus of claim 87 wherein said fact compared with said THEN part is a second fact obtained when said first fact is compared with said IF part.

89. The apparatus of claim 86 wherein said means for searching repeatedly searches the knowledge base.

90. The apparatus of claim 43 wherein said means for searching repeatedly searches the knowledge base.

91. The apparatus of claim 50 wherein said step of searching the knowledge base occurs in accordance with a selected fact and in a predetermined sequence in which said fact is compared with one of an IF part and a THEN part to obtain the corresponding THEN part of IF part, respectively,

*and then comparing a fact with the other of an IF part or THEN part of the rules to obtain the corresponding THEN part or IF part, respectively, as a result of the comparison.*

*92. The apparatus of claim 91 wherein said sub-step of searching first compares a first fact with an IF part of a rule to obtain a corresponding THEN part and subsequently compares a fact with a THEN part of a rule to obtain a corresponding IF part.*

*93. The apparatus of claim 92 wherein said fact compared with said THEN part is a second fact obtained when said first fact is compared with said IF part.*

*94. The apparatus of claim 91 wherein said step of searching the knowledge base is repeated.*

*95. The apparatus of claim 50 wherein said step of searching the knowledge base is repeatedly carried out.*

* * * * *